June 24, 1969     M. C. GOURDINE     3,452,225
ELECTROGASDYNAMIC SYSTEMS
Filed Aug. 13, 1964     Sheet 4 of 5
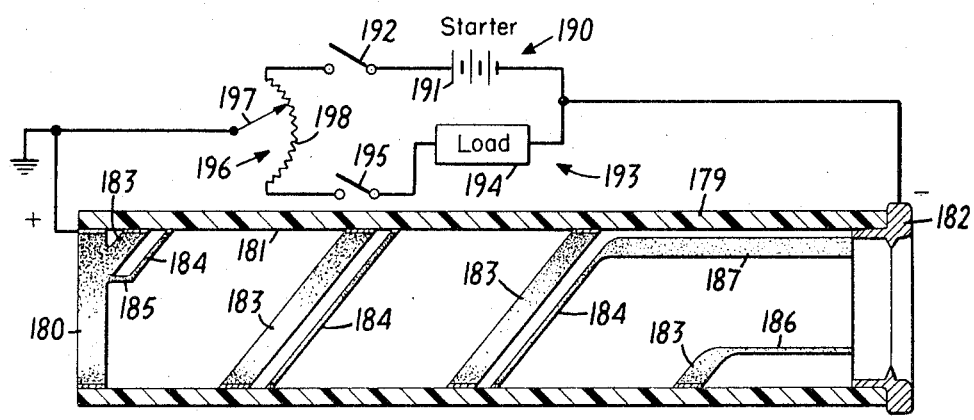
FIG. 15
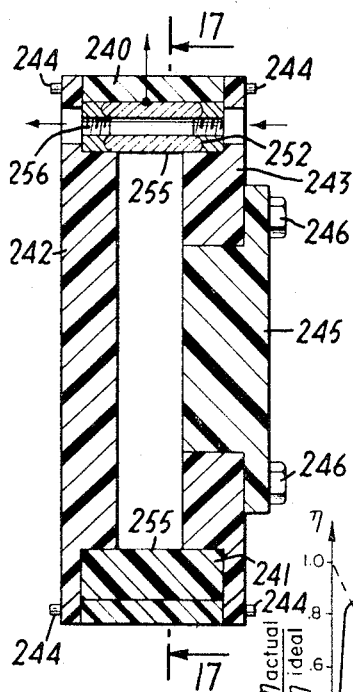
FIG. 16
FIG. 17
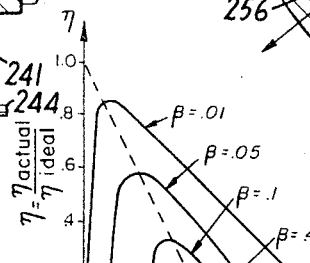
FIG. 24
EFFICIENCY VS ASPECT RATIO
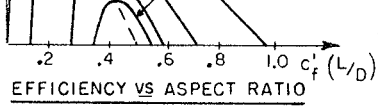
INVENTOR.
MEREDITH C. GOURDINE
BY Brumbaugh, Free,
Graves + Donohue
his     ATTORNEYS

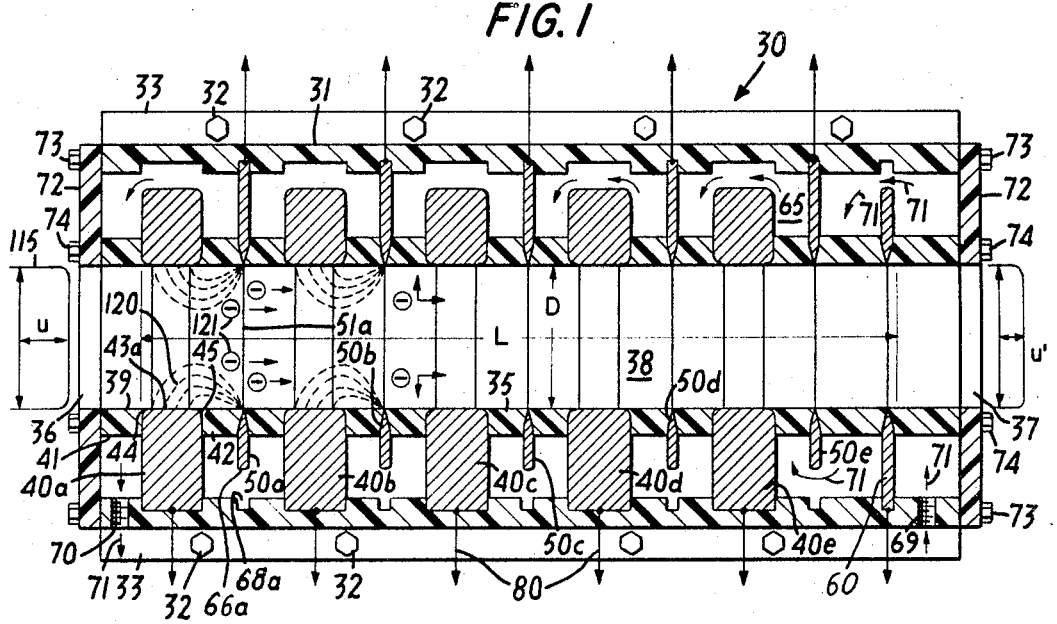

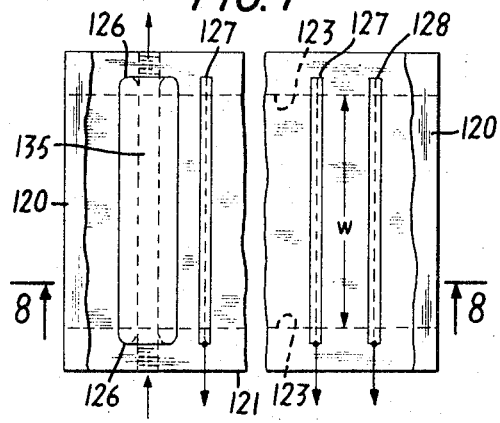
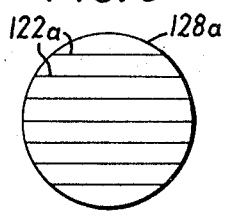
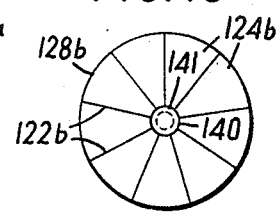
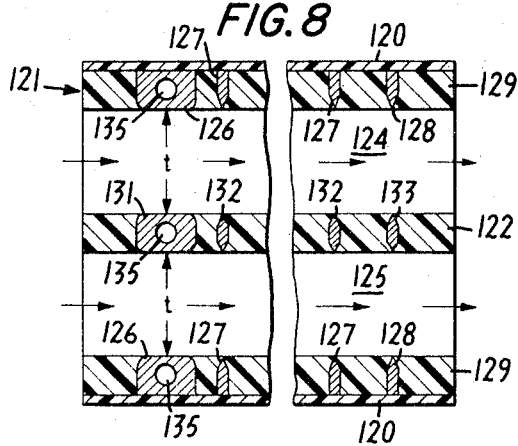
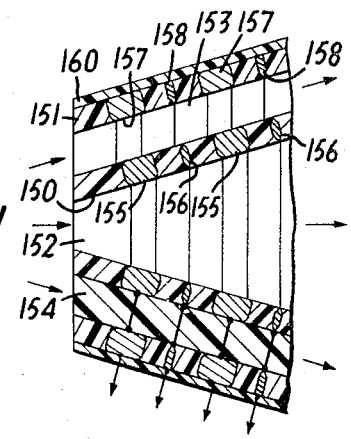
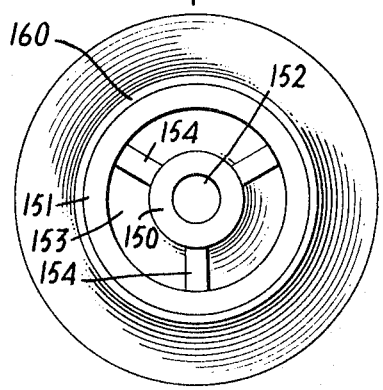
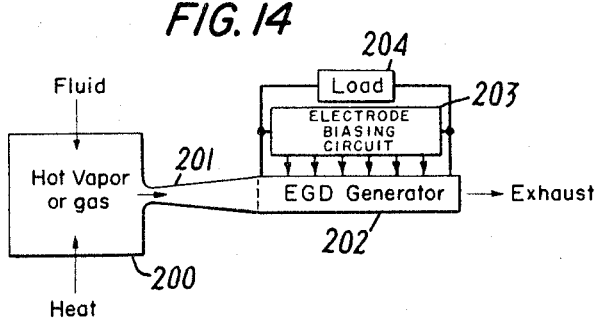

EFFICIENCY VS ION SLIP RATIO

INVENTOR.
MEREDITH C. GOURDINE

United States Patent Office 3,452,225
Patented June 24, 1969

3,452,225
ELECTROGASDYNAMIC SYSTEMS
Meredith C. Gourdine, Oakland, N.J., assignor to Gourdine Systems Incorporated, Teaneck, N.J., a corporation of Delaware
Filed Aug. 13, 1964, Ser. No. 389,360
Int. Cl. H02k 45/00
U.S. Cl. 310—11                  56 Claims

ABSTRACT OF THE DISCLOSURE

Electrogasdynamic conversion apparatus in which spaced ionizing fields and at least one body force field are established in a flow path bounded by a dielectric channel. The ionizing fields are each established between pairs of attractor and corona electrodes which are disposed to be substantially flush with the boundary of the flow path and axially displaced in the direction of flow through the channel. A body force field, i.e., an electric field tending to react with charges induced by the ionizing fields, is set up between a terminal collector electrode downstream of the ionizing electrodes and between successive pairs of ionizing electrodes, each of which is at a progressively different potential than the preceding electrodes in the direction of flow.

---

This invention relates to electrogasdynamic systems wherein the kinetic energy of a fluid is converted into electrical energy or conversely. More particularly, this invention relates to systems of such sort characterized by improved efficiency and other advantages as compared to the electrogasdynamic systems known to the prior art.

Electrogasdynamic (EGD) coupling is a phenomenon in which an electrostatic force and a fluid interact through the medium of ions in the fluid, the ions being attracted or repelled by the force so that there is an exchange of energy therebetween, and the ions colliding with the neutral molecules of the fluid so that there is an exchange of energy between such ions and neutral molecules and, therefore, between the electrostatic force and the body of the fluid. By virtue of such an electrogasdynamic coupling, kinetic energy of a fluid can be converted into electrical energy or, conversely, electrical energy can be converted into kinetic energy, all without the need for any moving mechanical parts. The electrogasdynamic coupling phenomenon is of itself not new and has been studied by many investigators, sometimes under the name of "Electric Wind."

Proposals have been previously made for effecting electrogasdynamic conversion by devices in which a moving ionized fluid passes through a channel and in which the electrostatic force is applied to the fluid by parallel plate electrodes extending across the channel. For such cross-channel configuration of the electrodes, it can be shown that space charge effects (produced by the charges on the ions in the fluid) limit the pressure drop (or rise) over one stage of the device to a value of something less than $10^{-3}$ atmosphere, i.e., a value much too small for any practical use. It has, therefore, been further proposed for a converter with cross-channel electrodes to increase the overall pressure drop (or rise) by multi-staging. If such is attempted, however, thousands of stages are required to obtain an overall pressure drop (or rise) of useful value, and the device is rendered impractical from the efficiency point of view by the high friction losses produced by the great number of electrodes extending across the flow path.

In an article by Kahn and Gourdine entitled "A Basic Study of Slender Channel Electrogasdynamics" (ARL Technical Documentary Report #63–205, office of Technical Services, U.S. Department of Commerce, Washington, D.C.), it is pointed out that the space charge effects which limit the pressure drop per stage for the cross-channel electrode configuration can be partly overcome by utilizing a channel which does not employ cross-channel electrodes. The converter devices disclosed in that article are, however, aerodynamically inefficient in that they employ a corona electrode mounted in the center of the channel so that the electrode and its mounting create an obstruction to the flow of the fluid. For that reason as well as for others, such devices are incapable of providing an electrogasdynamic conversion of acceptable efficiency.

In accordance with one aspect of the present invention, an improvement over the prior art in conversion efficiency is obtained by mounting all the electrode means of the EGD converter at the side of the flow path for the fluid so that the coefficient of friction of the fluid flow path is reduced.

In accordance with another aspect of the invention, a further reduction in the coefficient of friction and other advantages are realized by providing for ionization of the fluid by corona electrode means and attractor electrode means of which both are disposed on the same side of the flow path for the fluid.

Further aspects of the invention relate to the use alone or together in electrogasdynamic systems of improved structural configurations for the dielectric fluid guide means, multi-channeling, ion replenishment, electrical energy feedback, A.C. operation, optimum applied electric field, optimum aspect ratio, electrogasdynamic conversion accompanied by cooling to render the conversion isentropic, and fluid flow characterized by a high Reynolds number. Still further aspects of the invention relate to various electrogasdynamic systems employing one or more of the improvements already mentioned.

For a better understanding of how these and other aspects of the invention are realized, reference is made to the following description of exemplary embodiments of the invention and to the accompanying drawings wherein:

FIG. 1 is a view in cross section of an electrogasdynamic converter device according to the invention, the cross section being taken through the axis of the device;

FIG. 2 is an end view of one of the corona electrode elements of the device of FIG. 1;

FIG. 3 is a schematic view of a modification of the FIG. 1 device;

FIG. 4 is a schematic diagram of a D.C. electrode circuit suitable for use with, for example, the FIG. 1 device, when that device is employed as an electrogasdynamic generator or decelerator;

FIG. 5 is a schematic diagram of a D.C. circuit suitable for use with, for example, the FIG. 1 device when that device is employed as an electrogasdynamic propulsor;

FIG. 6 is a schematic diagram of an A.C. circuit for use with, for example, the FIG. 1 device when that device is to be employed as an A.C. generator or A.C. fluid propulsor;

FIG. 7 is a plan view of the upstream and downstream end portions of a multi-channel electrogasdynamic device in which each channel is of rectangular cross section and has a greater lateral width than transverse width, the top of the casing for the device being removed in FIG. 7 in order to better show the underlying components;

FIG. 8 is a view in cross section of the FIG. 7 device, the cross section taken as indicated by the arrows 8—8 in FIG. 7;

FIG. 9 is a schematic view of the front end of a modification of the FIG. 7 device;

FIG. 10 is a schematic view of the front end of another modification of the FIG. 7 device;

FIG. 11 is a view in cross section of the upstream end portion of a multi-channel electrogasdynamic converter device characterized by nested tubes, the cross section being taken as indicated by the arrows 11—11 in FIG. 12;

FIG. 12 is a view in elevation of the front end of the FIG. 11 device;

FIG. 14 is a schematic view of an open cycle electrogasdynamic system;

FIG. 15 is a view in cross section of an electrogasdynamic converter in which the corona and attractor electrodes are of helical configuration, the cross section being taken through the axis of the device;

FIG. 16 is a view in cross section of an electrogasdynamic rotary wind tunnel, the cross section being taken as indicated by the arrows 16—16 in FIG. 17;

FIG. 17 is a view in radial cross section of the FIG. 16 device, the cross section being taken as indicated by the arrows 17—17 in FIG. 16;

FIG. 23 and FIG. 24 are graphs relating the efficiency of an EGD converter to certain operating parameters.

Figure 13:
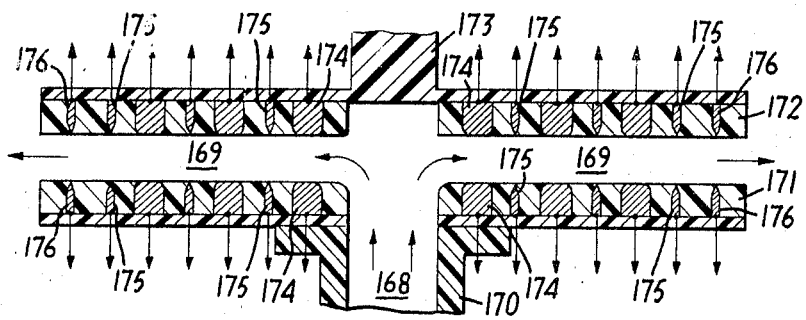
FIG. 13 is a view in cross section of an electrogasdynamic converter device in which the converter channel is defined between spaced annular plates, the cross section being taken through the axis of the device.

Referring now to FIG. 1, the reference numeral 30 designates an EGD converter having a split tubular dielectric casing 31 comprised of two semi-cylindrical halves joined together by bolts 32 passing through mating axial flanges 33 on the two halves. In FIG. 1, only the front half of the casing and the flanges 33 on that front half are shown. A gasket (not shown) may be disposed between each pair of bolt-joined flanges 33 in order to make the casing peripherally fluid-tight.

Disposed inwards of and spaced from casing 31 is dielectric fluid guide means in the form of a tube 35 of dielectric material which may be a synthetic resinous, ceramic, polycarbonate plastic or other organic or inorganic insulating material, the particular dielectric material which is used being selected to have properties suitable for the pressure, temperature and other conditions characterizing the operation of the converter. The tube 35 is definitive of a flow path for a stream of fluid which enters the tube at its upstream left-hand end 36 and leaves the tube at its downstream right-hand end 37. In the FIG. 1 converter, such flow path is in the form of a channel 38 defined by and enclosed by the circular-cylindrical interior wall surface 39 of tube 35. Within channel 38, the line of flow of the fluid extends between the tube ends 36 and 37 and is axial in direction whether direction along the tube axis is considered to be from the upstream to the downstream end or to be from the downstream to the upstream end. The direction of the line of flow of the fluid is thus to be distinguished from the direction of flow of the fluid which is always from the upstream to the downstream end.

Incorporated in tube 35 is the first electrode 40a of a set of attractor electrodes 40a–40e spaced from each other along the length of the tube and generally designated by the reference numeral 40. The electrode 40a is in the form of a generally annular ring of copper, tantalum (for high temperature work) or other suitable electroconductive metallic material. As shown, electrode 40a is disposed between two dielectric sections 41 and 42 of tube 35 so as, in relation to channel 38, to be recessed in the dielectric material of the tube. Electrode 40a has an inner circular-cylindrical axial wall surface 43a flush with the dielectric wall surface 39 of tube 35, such electrode surface 43a being axially broad and smooth so as to avoid producing stress concentration in an electric field terminating thereon. The electrode surface 43a is joined to the radial wall surfaces on the axially opposite sides of electrode 40 by edge portions 44 and 45 which are rounded to avoid the stress concentrations which might be produced in such field by sharp edges exposed to the field. Those rounded edge portions 44 and 45 are in contact with rounded portions of the respectively adjacent dielectric sections 41 and 42 so that the dielectric wall surface 39 is smoothly continuous with the electrode wall surface 43a.

Associated in paired relation with the attractor electrodes 40a–40e are a set of corona electrodes 50a–50e generally designated by reference numeral 50, the corona electrode 50a being paired with the attractor electrode 40a, and so on. As shown, electrode 50a is positioned downstream of its associated electrode attractor 40a between the last named electrode and attractor electrode 40b, the subsequent corona electrode being positioned in like manner so that each is downstream of its paired attractor electrode and (except for the last corona electrode 50e) is between two attractor electrodes.

The corona electrode 50a is like attractor electrode 40a in that it is in the form of a generally annular ring of metallic material and (in relation to channel 38) is recessed in the dielectric material of tube 35. Corona electrode 50a is, however, unlike attractor electrode 40a in that the corona electrode is axially thin and has a radially inner portion which is tapered to form a sharp circular edge 51a at the inner diameter of the electrode. The taper of electrode 50a is matched by a shaping of the dielectric material to either side of that electrode so that such dielectric material is in contact with electrode 50a right up to the edge 51a. Moreover, the diameter of circular edge 51a is the same as the diameter of the dielectric wall surface 39. Therefore, the electrode edge 51a is just exposed to the boundary region of channel 38, and the electrode edge forms with dielectric wall surface 39 a smooth continuous bounding surface for the channel.

In lieu of utilizing the described edge 51a which is peripherally continuous, the corona electrode 50a may have (FIG. 2) a circular inner edge which is axially sharp, but which is rendered peripherally discontinuous by serrations 52 forming sharp points around the edge.

Each of electrodes 40b–40e is structurally the same as electrode 40a, and each of electrodes 50b–50e is structurally the same as electrode 50a, wherefore no further description of electrodes 40b–40e and 50e–50b need be given. The number of pairs of attractor and corona electrodes and the spacing between electrodes may be varied widely for purposes of best adapting the converter to the characteristics of the stream of fluid being used therein. Thus, for example, in certain instances (later explained), only a single attractor-corona electrode pair is necessary in order to obtain best performance of the converter. In other instances, it may be desirable to use a great many more pairs of attractor and collector electrodes than the five pairs thereof which are shown in FIG. 1. Depending upon operating conditions, the spacing between each attractor electrode and its associated corona electrode should be increased or decreased, the general rule being that, the lower the mobility of the ions in the fluid, the greater the inter-electrode spacing which is optimum. While, in FIG. 1, each corona electrode (except 50e) is shown as being disposed midway between its paired attractor electrode and the next following attractor electrode, such mid-way spacing is not necessary and particular operating conditions may make it advantageous to space each corona electrode closer to its paired attractor electrode than to the next following attractor electrode.

Downstream of the last corona electrode 50e is a collector electrode 60. While electrode 60 is similar to the corona electrodes in respect to structure and mode of incorporation in tube 35, as later explained in detail, the collector electrode 60 differs in function from the corona electrodes.

The electrodes 40a–40e have heretofore been referred to as attractor electrodes. In operation, however, the electrodes 40b–40e besides being "attractors" are "collectors" of ions driven to the wall of tube 35 and, hence, could be alternatively termed "attractor-collector" electrodes.

In the FIG. 1 converter, cooling of the fluid passing through the converter is provided in a manner as follows. The electrodes of the converter project radially outward of tube 35 and are received at their radially outer margins in circular slots formed in and extending around the inner wall of casing 31. In this manner, the portions of the electrodes which are radially salient from tube 35 form baffle-like barriers in the annular, axially extending space 65 between the casing and the tube. Those barriers are, however, gapped at one point around their peripheries because of the shape of the electrodes as exemplified by that of corona electrode 50a.

While corona electrode 50a is generally annular (FIG. 2), the outer periphery of the electrode is characterized by a flat 66a formed by a cutting away from the round electrode blank of a sector portion 67a. Flat 66a is rounded axially (FIG. 1) and is peripherally rounded at its ends (FIG. 2) so as to eliminate sharp edges productive of stress concentrations in an electric field terminating on the flat portion of the electrode. The presence of flat 66a on electrode 50a creates between casing 31 and the electrode a gap 68a in the barrier provided across space 65 by the electrode.

Each of the other electrodes of the FIG. 1 converter is shaped to have a similar flat which is axially and peripherally rounded. The several electrodes of the tube are angularly positioned relative to each other so that alternate electrodes in the length of the tube have respective flatas on axially opposite sides of the tube. Hence, the tube electrodes define in space 65 a labyrinthine passageway through which water or some other cooling fluid can flow axially through space 65 from an inlet 69 at the downstream tube end 37 to an outlet 70 at the upstream end 36, such flow of cooling fluid being generally indicated by the arrows 71. To the end of confining the flow of cooling fluid to such passageway, the ends of space 65 are closed by annular end plates 72 joined by bolts 73 and 74, to respectively, the casing 31 and the dielectric tube 35. Gaskets (not shown) may be utilized to render fluid tight the joints between the end plates and, respectively, the casing and the tube.

The FIG. 1 converter may be constructed by assemblying its electrodes and dielectric sections on a mandrel, baking the resulting tubular structure to fuse the electrodes and dielectric sections together, assemblying the two halves of casing 31 around such tubular structure, bolting together the two halves of the casing, and bolting the end plates 72 to the assembled casing and dielectric tube.

Electrical connections are made from the electrodes of the converter to the exterior thereof by means of leads 80. In FIG. 1, those leads are shown as passing in an unsealed manner through holes in casing 31. In order, however, to prevent leakage of cooling fluid from space 65 through those holes, the holes are, in practice, usually sealed by the use therein of sealing compound or by the insertion therein of stuffing tubes through which the leads pass.

The converter electrodes may be connected to any one of the external circuits which are shown by, respectively, FIG. 4, FIG. 5 and FIG. 6.

The FIG. 4 circuit is a D.C. circuit usable with converter 30 when the converter is employed as a D.C. voltage generator (or fluid flow decelerator) and when negative ions are produced in the fluid in the converter. In FIG. 4, a high impedance load 85 is connected between a positive terminal 86 and a negative terminal 87. Extending between those terminals is a resistive voltage divider means 88. The attractor electrode 40a is connected to terminal 86. The remaining attractor electrodes 40b–40e are connected to network 88 at tap points 89 spaced along the network so that the potential on the various attractor electrodes becomes increasingly negative with increased distance in the downstream direction in the positioning of electrodes away from the converter's upstream end.

The electrodes 50a–50e are connected to network 88 at tap points 90 intervening points 89 such that each corona electrode is at a negative potential with respect to its paired attractor electrode. The collector electrode 60 is connected to negative terminal 87. A starting circuit comprised of a D.C. voltage source 92 (represented schematically as a battery) and a switch 93 is connected between attractor electrode 40a and the paired corona electrode 50a, voltage source 92 being polarized so that, when switch 93 is closed, the source impresses on electrode 50a a potential which is negative relative to attractor electrode 40a. A similar starting circuit comprised of a voltage source 94 and a switch 95 is connected between the attractor electrode 40c and its paired corona electrode 50c.

The FIG. 4 circuit may be adapted to produce positive ions in the fluid passing through the converter, by reversing the connection in the starting circuits of the voltage sources therein so that, for example, the negative terminal of source 92 is towards attractor electrode 40a and the positive terminal of that source is towards the corona electrode 50a. When the starting circuit voltages are so reversed, the terminals 86 and 87 operably become, respectively, a negative terminal and a positive terminal.

The FIG. 5 circuit is a direct current circuit usable with the FIG. 1 converter when the latter is employed as a D.C. fluid propulsor and when negative ions are produced in the fluid. The FIG. 5 circuit differs from that of FIG. 4 in that the load 85 is replaced by a high voltage source 97 connected between terminals 86 and 87 and polarized to make terminal 87 positive relative to terminal 86. Other differences of the FIG. 5 circuit are that it contains no starting circuits, and the tapping point connections of the attractor and corona electrodes to the resistive voltage divider network 88 are changed so that the positive voltage drop across network 88 from terminal 87 to terminal 86 serves to produce on each corona electrode a potential which is negative relative to the paired attractor electrode. The FIG. 5 circuit may be adapted to D.C. fluid propulsor purposes when positive ions are to be produced in the fluid by the simple expedient of reversing the connections of source 97.

The FIG. 6 circuit is usable in conjunction with the FIG. 1 converter when that converter is to be employed as an A.C. generator or A.C. fluid propulsor. In the FIG. 6 circuit when used for A.C. generator purposes, the tapping point connections of the attractor and corona electrodes to the voltage divider network are the same as in FIG. 4, but the network itself is different since it is a reactance network 98 comprised of a string of serially coupled condensors connected between the terminals 86 and 87. Also connected between those terminals is one winding 99 of a transformer 100 of which the other winding 101 has a lesser number of turns than 99 and is connected across a load 102 when the converter and FIG. 6 circuit act together as an A.C. voltage generator. In operation, the winding 99 of transformer 100 is in parallel with a condenser 103, the capacitance of the condensers 98 and condenser 103 and the inductance of the transformer together forming a parallel tuned circuit which is resonant at a relatively low frequency (e.g., from 60 to $10^4$ cycles per second). A single pole double throw switch 104 permits condenser 103 to be connected either across the said transformer winding 99 or across a starting voltage source 105.

The FIG. 6 circuit may be converted from an A.C. voltage generator circuit to one suitable for effecting A.C. fluid propulsion (in conjunction with converter 30) by a switch 110 inserted in the circuit for transformer winding 104 in a manner whereby that winding may be disconnected from load 102 and connected to an A.C. voltage source 111. A further change which is made to render the FIG. 6 circuit suitable for fluid propulsion purposes is to criss-cross the tapping point connections of the attractor and corona electrodes in the manner indicated by dotted lines 112.

For A.C. voltage generation, load 102 is connected in circuit with transformer winding 101, power is supplied from winding 99 to winding 101 which is the secondary winding for A.C. generation purposes, and the transformer acts as a voltage step-down transformer. For A.C. fluid propulsion, transformer winding 101 is connected in circuit with A.C. voltage source 111, that winding becomes the primary winding, power is transferred from winding 101 to winding 99 which is the primary for A.C. generation purposes but has now become the secondary, and the transformer 100 now acts as a voltage step-up transformer. For some applications the transformer 100 is not necessary.

The operation of the combination of the FIG. 1 converter and of the FIG. 4 circuit to provide D.C. voltage generation is, briefly, as follows. To initiate operation, the starting switches 93 and 95 are closed to impress on each of corona electrodes 50a and 50c a potential which is negative relative to the respective paired attractor electrode. Concurrently, a liquid cooling medium is introduced at inlet 69, circulates outside and along tube 35 through the described labyrinthine passageway and exits at outlet 70. A stream of ionizable gaseous fluid from a nozzle or other source thereof (not shown) is then passed at supersonic speed $u$ through channel 38 from end 36 to end 37 of tube 35. As shown by the entrance velocity profile 115 for the fluid, the flow of the fluid through channel 38 is turbulent.

The potential between electrodes 40a and 50a creates in the boundary region of the fluid stream an along-channel ionizing electric field 120 by which negative ions 121 are created in the fluid. Those ions collide with the neutral molecules of the fluid so as to be swept downstream by the fluid flow. Because the attractor electrode 40a is upstream of the corona electrode 50a, the downstream movement of the originally formed ions removes them from the region of field 120 to unshield electrode 50a from electrode 40a, wherefore field 120 requires less power to produce a desired ion density than if attractor electrode 40 were downstream of corona electrode 40a. The field 120 therefore operates with good efficiency to continuously produce more ions in the moving fluid.

As the ions move downstream, the mutual electrostatic repulsion of their charges produces a deposition of the ions on the wall of the channel or in the viscous boundary layer of the fluid which is immediately adjacent that wall. Thus, of the ions produced by field 120, a fraction thereof is deposited on attractor electrode 40b, another fraction thereof is deposited on attractor electrode 40c, and so on down the length of the tube to the collector electrode 60 on which some negative ions are also deposited. A like deposition takes place of the ions produced by the ionizing field developed between electrodes 40c and 50c by the starting circuit 94, 95.

The described deposition of ions on electrodes connected to voltage divider network 88 creates across that network a potential which is negative relative to terminal 86, and which progressively builds up until collector electrode 60 and all the other electrodes are at designed operating potential such that steady state operation of the system has been attained. Thus, the voltage divider network and the connections of the electrodes thereto permit by the described build-up the initiation of operation of the converter by one or more starting potentials which are of much less value than the normal operating potential between terminals 86 and 87.

Under steady state operating conditions, each pair of associated attractor and collector electrodes produces an ionizing field so that deposition of ions on the wall of the channel is compensated for by replenishment of the fluid with new ions. In this way, a substantially uniform and maximum density of ions in the fluid is maintained throughout the length of the channel so that the converter is operating with full efficiency over that length. Further, the draining away from the channel by the attractor electrodes of the ions driven into the stagnant fluid boundary layer at the wall of the channel improves the efficiency of operation of the converter in that such ions, if not removed, would be axially driven in the upstream direction by the electric fields in the channel so as to create in that viscous boundary layer for the fluid a counter current to the downstream movement of the main body of the fluid.

The ions created in the fluid by the ionizing fields are swept downstream by collisions with neutral molecules of the fluid so that the ions are moved by the body of the fluid against the ion-repelling force produced by the potential between the leading attractor electrode 40a and the collector electrode 60. In so being moved, the ions gain potential electric energy and the body of the fluid loses kinetic energy because the axial electric repelling field causes the ions to slip rearward relative to the fluid molecules, and, therefore, the ion-molecule collisions slow up the molecules, and, consequently, the body of the fluid. Thus, there is a conversion of kinetic energy of the fluid into electrical energy.

Such electrical energy is tapped from the stream of fluid primarily by the collector electrode which neutralizes the negative ions in the fluid by in effect, discharging positive charges into the stream. Of the electrical energy made so available, a major fraction thereof is applied to load 85 and a minor fraction thereof is applied to the voltage divider network 88 to maintain the ionizing fields produced by the paired attractor and corona electrodes. That is, there is a feedback of some of the electrical energy produced by the converter to the ionizing fields which serve (in conjunction with the kinetic energy of the fluid) to produce such electrical energy. Because of such feedback, the converter is self-energizing and needs no external source of electric power except for starting.

After the fluid passes collector electrode 60, the fluid has done its work and is discharged from the downstream end of the channel. At such downstream end, the fluid has a velocity $u'$ which is smaller than the entrance velocity $u$ because of the loss of kinetic energy of the fluid. As it exits, the flow of the fluid is still turbulent as indicated by the velocity profile 125.

To understand better in electrical terms the operation of the converter, the ionizing fields in channel 38 may be imagined as electric loads of which each is connected between the paired attractor electrode and corona electrode which creates such field, and the moving body of fluid may be considered as a high voltage battery having a positive terminal connected to electrode 40a, a negative terminal connected to electrode 60 and intermediate terminals disposed along the length of the battery, each intermediate terminal being connected to a corresponding one of the electrodes intermediate elements 40a and 60. The simile just drawn is not electrically accurate in all respects since it does not take into account such factors as that a corona electrode emits electrons freely into the fluid (in order to form negative ions) but is an inefficient neutralizer of deposited negative ions (because of the small area of the corona edge and the tendency of the corona electrode potential to repel negative ions), whereas an attractor electrode is a poor emitter of electrons into the fluid but, because of its broad electrode surface area, is well adapted to neutralize negative ions driven to the wall of the channel. In this connection, the operative difference between the attractor electrodes subsequent to 40a and the collector electrode 60 is that such attractor electrodes "collect" or neutralize ions driven to the channel wall but do not appreciably "collect" ions away from that wall whereas the collector electrode 60 "collects" or neutralizes ions disposed in the fluid away from the channel wall but (because of the small area of its sharp edge) does not appreciably "collect" or neutralize ions driven to the channel wall. The operative difference between the corona electrode and the collector electrode is that each corona electrode is caused by the field between it and its paired attractor electrode to emit electrons into the fluid, whereas the collector electrode is caused by the negative space charge field of the negative ions in the fluid to emit positive charges into the fluid to thereby neutralize those ions.

The described conversion of the kinetic energy of the fluid to electrical energy is accompanied by heat losses due to (a) Joule heating of the fluid by ion slip, and (b) viscous heating of the fluid due to friction losses in the channel. For efficient conversion, however, the conversion should be isentropic, and, in the instance where the fluid flow is supersonic, an isentropic conversion can be effected only by exterior cooling of the fluid. Therefore, in the FIG. 1 converter, the fluid in channel 38 is cooled by the medium circulated through space 65. That is, the heat of the fluid is transmitted through the metal of the electrodes to the cooling medium to be removed by that medium. As previously pointed out, those portions of the electrodes which are exposed to the cooling medium (i.e., are not covered up by dielectric material) have rounded edges so that no voltage breakdown occurs through the medium between adjacent electrodes because of the potential existing between such electrodes.

As described if the polarity of the starting batteries 92 and 94 is reversed, and if the fluid is one in which positive ions can be created, the FIG. 1 converter together with the FIG. 4 circuit will produce direct current high voltage by a positive ion mode which is similar to the negative ion mode just described, and in which terminal 87 will be at a positive potential relative to terminal 86.

The FIG. 1 converter in conjunction with the FIG. 5 circuit is adapted to produce fluid propulsion of a fluid with negative ions therein by virtue of the fact that the high voltage source 97 produces on electrode 60 a potential which is positive relative to electrode 40a, wherefore, the resulting applied field $E_x$ or "body force" in channel 38 attracts rather than repels the negative ions. The attracted ions collide with the neutral molecules of the fluid to thereby exert on the body of the fluid a propelling force directed towards the downstream end of channel 38. As before, the attractor and corona electrodes are energized by the voltage drop across network 88, but, since terminal 87 is now positive relative to terminal 86, it is now necessary to crisscross in the manner shown the connections of the attractor and corona electrode to network 88 so as to render each corona electrode of negative potential relative to its paired attractor electrode. Other differences of the fluid propulsor system from the earlier described voltage generator system are that exteriorly supplied electrical energy is converted into mechanical energy of the fluid, the potential of the system between terminals 86 and 87 is not self-building from a relatively low starting potential, and the slip of the ions relative to the neutral molecules of the fluid is in the forward or downstream direction. For supersonic fluid flow, the main effect of the fluid propelling action is to accelerate the fluid, whereas, for subsonic flow, the main effect of the propelling action is to compress the fluid. Otherwise, the system of FIG. 1 plus FIG. 5 operates in substantially the same manner as the system of FIG. 1 plus FIG. 4.

As in the case of the system of FIG. 1 plus FIG. 4, a positive ion mode of operation may be obtained from the system of FIG. 1 plus FIG. 5 by reversing the polarity of high voltage source 97 and by using a fluid in which positive ions may be created.

Turning now to the A.C. operation provided by the combination of the FIG. 1 converter and the FIG. 5 circuit, for A.C. voltage generation, switch 110 is closed to connect load 102 to transformer winding 101. Switch 104 is then thrown to charge condenser 103 from voltage source 105. Subsequently, switch 104 is thrown to connect charge condenser 103 in shunt with transformer winding 99 so as to produce oscillation of the tuned circuit formed by that condenser and by the transformer. Concurrently, there is passed through channel 38 at high speed a fluid capable of having both positive and negative ions created therein.

The oscillations of the tuned circuit are transmitted through reactance network 98 to cause the potential of each corona electrode to alternately swing positive and negative relative to the paired attractor electrode. The tuned circuit has a resonant frequency of a value such that the duration of each half cycle of oscillation is substantially longer than the transit time of the ions from the electrode 40a to the collector electrode 60. Accordingly, for the negative half cycle (i.e., when terminal 87 is negative in potential relative to terminal 86), the operation of the A.C. system is analogous to the described negative ion mode of operation of the D.C. voltage generator system of FIG. 1 and FIG. 4, and, for the positive half cycle, the operation of the A.C. system is analogous to the positive ion mode of operation of that D.C. system. Once the A.C. system is fully in operation, A.C. electrical energy is developed between terminals 86 and 87. A minor fraction of that energy is fed-back through reactance network 98 to the attractor and corona electrodes to maintain the ionizing fields therebetween. Another minor fraction of such energy is utilized to maintain the oscillation of the tuned circuit which stabilizes the frequency of the generated A.C. energy to be at or near the resonant frequency of the tuned circuit. The major fraction of the generated A.C. energy is stepped down in voltage by transformer 100 and is then applied to load 102.

For operation of the A.C. system as a fluid propulsor, the corona and attractor electrode connections are crisscrossed as indicated by lines 112, and switch 110 is thrown to connect the A.C. voltage source 111 to the transformer winding 101. If source 111 has the same A.C. frequency as that of the tuned circuit formed by condenser 103 and transformer 100, the condenser may be left connected by switch 104 in parallel with the transformer. Otherwise, switch 104 is thrown to neutral position such that condenser 103 is connected neither to voltage source 105 nor to the transformer. When the electrical connections have been completed, there is passed, as before, through 38 a high speed flow of fluid capable of having either negative or positive ions created therein.

The voltage from source 111 is stepped up by transformer 100 and then is applied between terminals 86 and 87 to drive the electrodes of the system so that a high voltage alternating potential appears between electrodes 40a and 60. Each corona electrode is thereby caused (through reactance network 98) to alternately swing positive in potential and negative in potential relative to its paired attractor electrode with a phase which is appropriate to a fluid propulsion. Note in this connection that, for A.C. voltage generation, the phase of the potential of each corona electrode relative to the paired attractor electrode is substantially the same as the phase of the potential on electrode 60 relative to electrode 40a, whereas, for fluid propulsion, the phase of such corona electrode potential is substantially opposite to that of such collector potential. From the descriptions previously given of D.C. fluid propulsion by the FIG. 5 circuit and of A.C. voltage generation by the FIG. 6 circuit, the further details of the operation of the FIG. 6 circuit for fluid propulsion purposes should be self evident and, hence, need not be specifically described herein.

It might be noted that an EGD voltage generator is a high-voltage low-current generating device.

Some aspects of operation of the FIG. 1 converter will now be discussed in further detail.

The positioning in the converter of the corona electrodes at side of channel 38 eliminates the friction loss produced in prior art devices by the location of the corona electrode and its mounting at the center of the channel. Such advantage becomes particularly important when a plurality of corona electrodes are used and/or when the fluid flow is supersonic such that a central obstruction in the channel would produce bad shock waves and very high friction losses. The positioning of the electrodes at the side of channel 38 is, however, also advantageous when the fluid flow through that channel is subsonic or sonic.

In electrogasdynamic converters, it is desirable to produce in the fluid the greatest ion density which is compatible with consumption of a reasonable amount of power by the ionizing fields. The advantage in so increasing the ion density to its maximum practical value is that the total body force exerted on a given cross-sectional area of the fluid stream is thereby maximized. For working fluids of one atmosphere pressure or greater the preferred ion density is $10^{17}$ ions/m.$^3$ or greater. For working fluids of less than one atmosphere pressure, less ion concentration is preferred.

Assuming that the average ion density over the cross section of the channel is of maximum practical value, the maximum size of the smallest cross-sectional channel dimension (which is the diameter when the cross-section is circular) is limited by the consideration that $E_r$ (the radial component at the channel wall of the ion space charge field) increases with increase in such dimension, and $E_r$ should not exceed the breakdown strength of the dielectric material of the channel wall. Thus, in a converter of the sort described, the smallest cross sectional dimension has a definite upper limit which is that value for such dimension at which, for a given number of ions in the channel cross section, the safe value for $E_r$ is not exceeded. In this connection it is to be noted that, while $E_r$ increases with the total number of ions in the channel cross section, $E_r$ is substantially the same irrespective of how such total number of ions is distributed throughout such cross section.

The discussed limitation on the size of the smallest cross sectional dimension of the channel applies both to the presently described FIG. 1 converter and to the prior art converter disclosed in the aforementioned article by Kahn and Gourdine.

Assuming, however, a converter of a given size and shape and of a given cross sectional dimension productive of maximum safe $E_r$, when the ion density in the channel cross section is of maximum practical value, the FIG. 1 converter has a greater effective diameter and effective cross sectional area than the mentioned prior art converter because the effective diameter and cross sectional area of the latter is reduced by the room taken up in the channel cross-section by the centrally positioned corona electrode and its mounting. Therefore, as compared to such prior art converter, under similar conditions, the FIG. 1 converter accommodates a larger volumetric flow of fluid at a given velocity, the Reynolds number characterizing the flow is larger to reduce friction losses, and the resulting structure is much simpler.

Of course, the smooth continuous channel wall serves to reduce friction losses. Moreover, the sharp edges of the corona electrodes are advantageous in that they efficiently produce an ion "flux" of high and uniform density around the wall of the channel.

Figure 19:
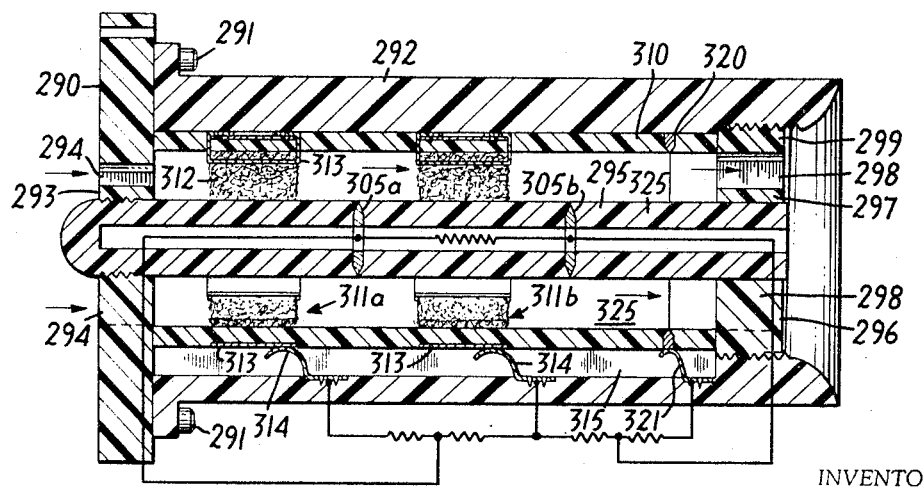
FIG. 19 is a view in cross section of an electrogasdynamic precipitator.

The advantages which have been described are realized when the attractor and corona electrodes are at the side of fluid flow path, whether they are on the same side of such path (so that the ionizing fields are "along-channel" as in FIG. 1) or are on opposite sides of such path (so that the ionizing fields are "cross-channel" as in FIG. 19).

Additional advantages of the location of the paired attractor and corona electrodes on the same side of the path are that the ionizing fields may be made shorter (by spacing the electrodes closed together) to thereby utilize less power, and, also (when deposition of ionized particles on the channel wall is disadvantageous), the increasing negative electrode potential in the downstream direction is a factor which tends to inhibit deposition of the ions on the wall.

In the FIG. 1 converter the turbulent flow of the fluid has the advantageous results of (a) blowing ions off the edges of the corona electrodes and downstream (b) inhibiting subsequent ion deposition on the channel wall (c) coupling the electric body force on the more richly ionized boundary region of the fluid to the less richly ionized central region thereof (d) introducing ions from the boundary region into the central region. Such turbulent flow takes place because the flow through the FIG. 1 converter is characterized by a high Reynolds number, i.e., of a value of 2000 or greater.

As the working fluid moves through the channel of the FIG. 1 converter, the described cooling medium removes the heat produced in the fluid by ion slip and friction substantially as fast as such heat is developed. Such external cooling is advantageous since it can be employed to render the EGD conversion isentropic or approximately so to thereby greatly improve the efficiency of conversion. Contrary to some teachings in the prior art, I have found that an isentropic EGD conversion can be realized only by external cooling of the working fluid (as opposed to internally converting such heat into kinetic energy by, say, expanding it through a diverging nozzle), and that such external cooling can be profitably employed whether the fluid flow is subsonic, sonic or supersonic. Inasmuch as, in an EGD converter, the working fluid can be progressively cooled as it moves down the channel, a converter of such sort is significantly superior from the heat removal point of view to a mechanical energy converter (e.g., gas turbine) in which the fluid cannot be readily cooled in its flow path and, in which, accordingly, the heat from friction or the like accumulates in the fluid.

The working fluid for the FIG. 1 converter may be a pure gas (e.g., hydrogen), a mixture of gases (e.g. air) or a vapor (e.g. steam). A parent gaseous fluid may be seeded with electronegative molecules (e.g., Freon, sulfur hexafluoride) or electropositive molecules (e.g., potassium chloride, sulfuric acid). For A.C. operation, the working fluid must be one capable of having both positive and negative ions created therein. Air is naturally such a fluid, and other suitable A.C. working fluids can be synthesized by seeding a parent fluid with both electronegative molecules and electropositive molecules.

In an energy conversion by the EGD phenomenon, the Joule heating loss from ion slip varies with the velocity of the slip, and such velocity varies inversely with the density of the fluid and inversely with the size and weight of the ions. Therefore, it is often desirable to seed a parent gas of small molecules with large electronegative molecules or with large electropositive molecules or (in the case of A.C. operation) with both. Moreover, to further reduce ion slip, the ionized particles of the working fluid may, instead of molecules, be ionized droplets or other large multi-molecular ionized particles entrained in a parent fluid.

Low mobility ionized particles are also desirable from the point of deposition of the particles on the channel wall. As the mobility of the ionized particles decreases, the rate at which these particles deposit on the channel wall (over a given length of channel for a given velocity of the stream) also decreases, wherefore, the successive pairs of attractor and corona electrodes may be spaced farther apart in the length of the channel, and less pairs need be used for a channel of given length. If the mobility of the ions or ionized particles is low enough (e.g., where the ionized particles are provided by an aerosol suspension of ionized droplets), only one attractor electrode and one corona electrode need be employed in the FIG. 1 converter.

In connection with the operation of EGD converters either as voltage generators or fluid propulsors, I have discovered that the operation thereof can be optimized in accordance with the following considerations.

Let us compare the actual efficiency of an EGD energy conversion process using a real EGD fluid, with the ideal efficiency of the same EGD process using an ideal fluid. The ideal EGD fluid has no viscosity or ion slip. In each case, let the change in total enthalpy flow rate across a duct of length L (between the first attractor electrode and the last collector electrode), and hydraulic diameter D be $\Delta(\dot{m}H)$, then the ratio of actual efficiency to ideal efficiency is $$\eta = \frac{\eta_{actual}}{\eta_{ideal}} = 1 - \frac{\dot{Q}}{\Delta(\dot{m}H)} \quad (1)$$

where $\dot{Q}$ is the heat generated by viscosity and ion slip, which must be removed by cooling in order to maintain the entropy constant in a process involving a real EGD fluid.

$$\dot{Q} = [f_f u + f_b U_i]\frac{\pi D^2 L}{4} = [\tau_f U + \tau_b U_i]\pi D L \quad (2)$$

where $f_f$ and $f_b$ are the body-forces due to friction and EGD respectively, $\tau_f$ and $\tau_b$ are the equivalent wall shear stresses, and $u$ and $U_i$ are the gas and ion slip speeds, respectively.

Using the fact that $$\Delta(\dot{m}H) = f_b u \frac{\pi D^2 L}{4} = \tau_b \pi D L u$$

we can write for Eq. 2

$$\frac{\dot{Q}}{\Delta(\dot{m}H)} = \frac{\tau_f}{\tau_b} + \frac{U_i}{u} \quad (3)$$

The friction ratio may be approximated by $$\frac{\tau_f}{\tau_b} = \frac{c_f \rho \bar{u}^2/2}{\epsilon_0 E_x E_r} \quad (4)$$

where $c_f$ is the friction coefficient P is the fluid density, $\epsilon_0$ is the dielectric coefficient of free space, $E_r$ is the radial component of the space-charge induced electric field at the dielectric walls of the channel, and $$\frac{\rho \bar{u}^2}{2}$$

is the mean dynamic pressure in the channel.

The ion slip ratio may be approximated by $$\frac{U_i}{u} = \frac{\bar{k}_i E_x}{u} \quad (5)$$

where $\bar{k}$ is the mean ion mobility, therefore Eq. 3 becomes, $$\frac{\dot{Q}}{\Delta(\dot{m}H)} = \frac{c_f \rho \bar{u}^2/2}{\epsilon_0 E_r E_x} + \frac{\bar{k}_i E_x}{u} \quad (6)$$

Substitution in Equation 1 yields $$\eta = 1 - \left[\left(\frac{c_f \bar{k}\rho;\bar{u}}{2\epsilon_0 E_r}\right)\left(\frac{\bar{k}_i E_x}{u}\right) + \left(\frac{k_i E_x}{u}\right)\right] \quad (7)$$

Figure 23:
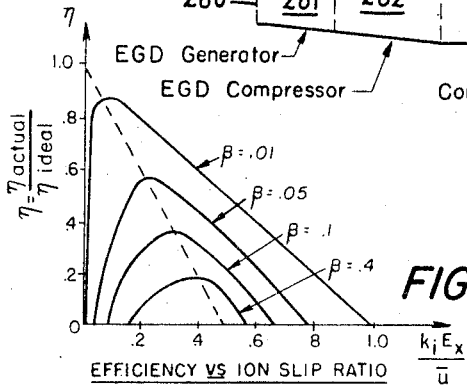

FIGURE 23 is a plot of $$\eta \text{ vs. } \frac{\bar{k}_i E_x}{u}$$

for various values of the parameter $$\beta = \left(\frac{c_f \bar{k}_i \rho \bar{u}}{2\epsilon_0 E_r}\right)^{1/2} \quad (8)$$

For each value of $\beta$ there is an optimum value of $$k_i E_x / \bar{u}$$

for which $\eta$ is maximized.

It corresponds to the condition where viscous and ion slip heating rates are equal; i.e., $$\frac{\bar{k}_i E_x}{u} = \beta^2 \frac{\bar{u}}{\bar{k}_i E_x} \quad (9)$$

or $$\frac{\bar{k}_i E_x^*}{u^*} = \beta$$

Thus, the optimum applied electric field is $$E_x^* = \frac{\bar{u}}{\bar{k}} \beta \quad (10)$$

and the maximum efficiency is $$\eta^* = 1 - 2\beta \quad (11)$$

Note that there is an upper limit on $\beta$ i.e. $\beta^2$ 0.5.

The length of the channel is determined by the momentum equation $$\Delta p = 2_0 E_x E_r \left(1 - \frac{\tau_f}{\tau_b}\right) \frac{4L}{D} \approx \frac{\Delta(\dot{m}H)}{\bar{u}} \quad (12)$$

and the aspect ratio is found to be, after using Eq. 4

$$\frac{L}{D} = \left(\frac{\Delta(\dot{m}H)}{\rho \bar{u}^3/2}\right) \frac{1}{4c_f} \frac{\beta^2}{\bar{k}_i E_x/\bar{u} - \beta^2} \quad (13)$$

or, $$\frac{\bar{k}_i E_x}{u} = \beta^2 \left(1 + \frac{1}{4C_f{}^1 L/D}\right) \quad (14)$$

where $$c_f{}^1 = c_f \frac{\rho \bar{u}^3/2}{\Delta(\dot{m}H)} \approx c_f \quad (15)$$

By substituting Eq. 14 into Eq. 7 we get FIGURE 24, a plot of $\eta$ vs. $c_f{}^1 L/D$ for various values of $\beta$. Since for for most flows of interest $\overline{\rho u^3}/2/\Delta(\dot{m}H)$ is of order unity, we can assume $c_f \approx c_f$, especially, since $c_f$ must be determined empirically. The friction coefficient $c_f$ decreases as the Reynolds number $$\left(R_e = \frac{\overline{\rho u} D}{\rho}\right)$$

increases. It depends on the entrance conditions, the roughness of the walls, and whether the flow is laminar or turbulent. It will usually be in the range $$10^{-2} < c_f < 10^{-3}$$

By way of summary, to design an efficient EGD component it is desirable to make $\beta$ as small as possible. Since $$\beta = \left(\frac{c_f \bar{k}_i \overline{\rho u}}{2\epsilon_0 E_r}\right)^{1/2}$$

it may be minimized by:

(1) Making the ion mobility $k_1$ small by seeding a parent fluid with large molecular ions, charged droplets, or charged dust particles.

(2) Making $E_r$ large by injecting as much space-charge as possible; limited only by the capability of the ion source and the dielectric strength of the walls.

(3) Making $C_f$ small by making channel walls smooth, and making the smallest cross sectional channel dimension as large as possible consonant with not exceeding the safe value for $E_r$.

Since $C_f$ decreases logarithmically as the Reynolds number of the fluid flow increases, it is, in general, desirable to have the flow characterized by a large Reynolds number (i.e., greater than 2000). The density $\rho$ of the fluid can be increased without commensurately increasing the value of $\beta$ because as $\rho$ increases, the value of $k_1$ decreases. Increasing the fluid velocity $\bar{u}$ increases $\beta$ but that consideration must be balanced against the other consideration that an increase in $u$ produces faster removal of ions from an ionizing field to thereby lessen the power needed for that field in order to produce optimum ion density. A decrease in the viscosity $\mu$ of the fluid is, of course, desirable because it increases the Reynolds number and thereby reduces $C_f$.

After $\beta$ is determined, and it must be less than 0.5, the component is preferably operated under optimum conditions, in which the applied field is given by $$\frac{\overline{k}_i E_x}{\overline{u}} = \frac{\overline{k}_1 E_x*}{\overline{u}} = \beta$$

and the length is given by $$\frac{L}{D} = \frac{1}{4c_f^1} \frac{\beta}{1-\beta}$$

where $$c_f^1 = c_f \frac{\overline{\rho} \overline{u}^3/2}{\Delta(mH)} \quad (16)$$

Operation approximating that obtained with optimum $E_x$ is realized, if the ion slip heating rate is at most twice that the viscous or friction heating rate and is at least half that of the friction heating rate.

As a representative example for a voltage generator or a fluid propulsor, consider the flow of air at STP at a speed of 300 m./s., in a channel with $C_f \approx 10^{-3}$ $$\overline{k}_i = 2 \times 10^{-4} \frac{m.^2}{V_0 H - sec.}$$

$$\overline{\rho} = 1 \text{ kg./m.}^3$$

$\overline{u} = 300$ m./sec.
$2_0 = 8.85 \times 10^{-12}$ (MKS units)
$E_v = 10^8$ volts/m. (the upper limit for good insulators)

Then, we find that $\beta = .185$, and that under optimum conditions $\eta = 0.63$. This is a reasonable component efficiency, but it can be improved significantly and easily by decreasing ion mobility by seeding.

The optimum aspect ratio for the example above is $$\left(\frac{L}{D}\right)^* = \frac{1}{4c_f^1} \beta = \left(\frac{\Delta(mH)}{\overline{\rho}\overline{u}^3/2}\right) \frac{\beta}{4c_f}$$

$$= \frac{185}{4} \left(\frac{\Delta(mH)}{\overline{\rho}\overline{u}^3/2}\right) \approx 46$$

where we assume that $$\frac{\Delta(mH)}{\overline{\rho}\overline{u}^3/2} \approx 1$$

for high speed flows.

Referring to the above expression (16), in practical applications $\beta$ preferably has a value of about 0.12 or more and $C_f$ preferably has a value of about 0.003. Hence, in practical application, a value of about 10 is the lower limit of the range of values within which the aspect ratio $L/D$ is optimum for the other operating conditions characterizing the EGD conversion. Often, however, considerations other than obtaining optimum $L/D$ make it desirable to use an aspect ratio of a value substantially less than 10, e.g. a value of as low as 5. The practical upper limit on $L/D$ occurs when $\beta = 0.5$; it is $4D \times 1000$ for $c_f = .003$.

Turning now to the other drawings, FIG. 3 represents schematically that channel 38 may be tapered or otherwise vary in cross section from its upstream to its downstream end. Either the left-hand end or the right-hand end of the FIG. 3 channel may be the downstream end thereof.

FIGS. 7–13 and 15 disclose converter structures which, unless otherwise expressly disclosed, are substantially similar in structure and operation to the FIG. 1 converter. Emphasis, therefore, will be on the differences between the FIG. 1 converter and those now to be discussed.

Since, as described, for optimum operation the smallest cross-sectional dimension of the channel has an upper limit, it often occurs that a single channel of circular-cylindrical cross section is insufficient to accommodate a desired volumetric rate of flow at a given velocity. Such limitation may be overcome by (a) suitably modifying the cross sectional shape of the channel, and (b) multi-channeling.

Both techniques are employed in the converter of which the upstream and downstream ends are shown in FIGS. 7 and 8.

In that converter, a dielectric casing 120 encloses a dielectric duct 121 having a hollow interior of rectangular cross section. A horizontal dielectric partition wall 122 extends between inner side walls 123 of duct 121 to divide the interior of the duct into two channels 124 and 125. Each of those channels has a lateral width $w$ and a transverse width $t$, the transverse width $t$ being smaller than $w$ and of a size such that the safe value of $E_r$ is not exceeded when the ion density in the fluid in each channel is of maximum practical value. Pairs of attractor and corona electrodes 126 and 127 (of which only one attractor electrode is shown) and a collector electrode 128 are molded into the dielectric material of the top and bottom walls 129 and 130 of duct 121 so as to border the respective sides away from wall 122 of channels 124 and 125. The sides of the channels towards wall 122 are bordered by pairs of attractor and corona electrodes 131 and 132 (only one attractor electrode shown) and by a collector electrode 133, all such electrodes being molded into the dielectric material of wall 122 and being spaced opposite corresponding electrodes in the top and bottom duct walls. The electrodes in partition wall 122 are "double-ended" in the sense that each provides an electrode surface (or edge) for each of channel 124 and channel 125. Cooling of fluid in the channels is effected by passing a liquid cooling medium through passages 135 extending through the attractor electrodes and from one lateral side to the other of the casing 120.

Besides the greater fluid capacity provided by multi-channeling, other advantages of the FIG. 8 converter are (1) the double-ended electrodes in wall 122 each serve two channels and thus reduce the number of electrodes needed, (2) cooling of the channels is facilitated because it is easy to connect cooling medium lines to the laterally opposite sides of the converter, and (3) while each of the channels 124 and 125 has a smallest cross-sectional dimension $t$ appropriate to limit $E_r$ to a safe value, each channel has a substantial lateral width $w$ and is continuous in cross section over that lateral width, wherefore each such rectangular channel develops lesser friction losses under given fluid flow conditions than would a bundle of tubular channels (of circular cross section) collectively providing the same fluid capacity as the rectangular channel, and each having a "safe" diameter equal to $t$.

FIG. 9 is a front end view of the FIG. 8 converter as modified to be fitted to an input nozzle or other fluid flow element of circular cross section. In the FIG. 9 modification, the dielectric duct 128a is in the form of a hollow tube of circular cross section, and the interior of such duct is divided into a plurality of fluid flow channels of polygonal cross section by a plurality of partition walls 122a similar to the wall 122 of FIG. 8. From the description already given of FIGS. 7 and 8, the remainder of the FIG. 9 structure should be self-evident.

FIG. 10 is a front end view of another modification of the FIG. 8 converter for the purpose of adapting it to be fitted to a circular input nozzle or the like. In FIG. 10, the partition walls 122b are radial walls extending between outer and inner dielectric ducts 128b and 140, the partition walls being equiangularly spaced around duct 140 to form a plurality of channels 124b of polygonal cross section. The electrodes of the FIG. 10 device are all in the partition walls and are all double ended like those in the wall 122 of FIG. 8. Thus, the FIG. 10 modification economizes on electrodes. While duct 140 is closed at its shown front end, the hollow interior 141 of the duct provides a service channel through which a cooling medium may pass to or from radial passages extending through the attractor electrodes and between that service channel and the exterior of the converter.

FIGS. 11 and 12 show the front end portion of a multi-channel converter of which the channels have cross sections which progressively increase in area in the downstream direction. The FIG. 11 converter is comprised of a dielectric frusto-conical casing 160 and of nested, concentric, spaced, frusto-conical tubes 150 and 151. Tube 150 encloses a tapered channel 152 of circular cross section, and tubes 150 and 151 define therebetween a tapered channel 153 of annular cross section. The inner tube is maintained in centered relation with the outer tube by three equiangularly spaced struts 154. The leads for the electrodes in tube 150 pass through the bottom strut to the exterior of the converter. Those last named electrodes are double ended annular electrodes serving both channel 152 and 153, and such electrodes are comprised of pairs of attractor electrodes 155 and corona electrodes 156 (two pairs being shown) and of a collector electrode (not shown) at the downstream end of the tube. The mentioned ended electrodes are matched by corresponding "single-ended" annular attractor electrodes 157 and corona electrodes 158 and a collector (not shown) in the tube 151.

Evidently, the number of channels in the FIG. 11 converter may be increased by nesting a plurality of tubes similar to 150 in spaced concentric relation within the outer tube 151.

FIG. 13 shows an EGD converter in which fluid passes through a central bore 168 in a hollow tube 170 and then flows radially through a channel 169 defined between two axially spaced dielectric plates 171 and 172 at right angles to the mentioned tube. As illustrated, plate 171 is supported by tube 170, and plate 172 is supported by a column 173 coaxial with and axially spaced from tube 170. Each of the plates has a plurality of paired annular attractor electrodes 174 and annular corona electrodes 175, and each of said plates also has at its radially outer margin an annular collector electrode 176. In common with the converter structures heretofore discussed, the spacing between plates 171 and 172 is such as to maintain $E_r$ at a safe value when the ion density in the fluid is at maximum practical value. As distinguished however, from those previously discussed converter structures, in the FIG. 13 converter, the direction of line of flow of the fluid is radial rather than axial. Another distinction of the FIG. 13 converter from, say, the FIG. 8 converter is that (in common with the annular channel of the FIG. 11 converter) the channel of the FIG. 13 converter has no side walls, wherefore friction losses are commensurately reduced.

As is evident, the FIG. 13 channel has a cross section transverse to the line of flow direction which increases rapidly with distance in the downstream or radially outward direction. Such channel cross section may, however, be rendered of constant area by making plates 171, 172 hyperbolic rather than planar. Moreover, the FIG. 13 converter may be multi-channeled by utilizing between outside plates 171 and 172 one or more dielectric annular partition plates (not shown) having double ended electrodes like those in wall 122 (FIG. 8). Heat may be removed from the fluid in channel by passing a cooling medium through annular passages, not shown, formed in the attractor electrodes 174 and having diametrically opposite inlet and outlet ports extending from such passages away from channel 169 to the exterior of the converter.

It is to be understood that any one of the converters so far described may employ any one of the circuits shown by FIGS. 4, 5 and 6 respectively, and that the cross-sectional area of the converter channel may be constant or may vary with distance along the channel in the downstream direction.

FIG. 15 shows an EGD D.C. voltage generator in which the electrodes are self biased rather than being biased by an external circuit. In FIG. 15, a hollow dielectric tube 179 has at its upstream end a ring electrode 180 formed of a thin film of metal deposited on the inner wall 181 of the tube. At its downstream end, the tube has a collector electrode 182. Between those two ends, the wall 181 has thereon an attractor electrode 183 in the form of a helical strip and a corona electrode 184 in the form of another helical strip having a constant axial spacing from strip 183. Each of strips 183 and 184 is formed of a thin film metal deposit on wall 181, and, by appropriate deposition techniques, each of those strips is rendered of approximately the same resistance per unit length.

At the upstream end of tube 179, the attractor electrode strip 183 is directly connected to electrode 180. The corona electrode strip 184 is, however, connected to element 180 by a narrow thin film "neck 185" of much higher resistance per unit length than the strip 184 itself. At the downstream end of the tube, the attractor electrode strip 183 is connected to collector electrode 182 through a narrow thin film "neck" of higher resistance per unit length than strip 183, and the corona electrode strip 184 is connected to electrode 182 through a broad thin film "neck" 187 of lower resistance per unit length than the strip 184.

Externally of tube 179, electrodes 180 and 182 are connected in a circuit comprised of a first branch 190 comprised of a high voltage starter source 191 and a switch 192, a second parallel branch 193 comprised of a load 194 and a switch 195, and a potentiometer 196 so connected to branches 190 and 193 that movement of the tap 197 of the potentiometer over its resistance winding 198 is adapted to selectively cut out branch 190 and simultaneously cut in branch 193.

To start the FIG. 15 converter, tap 197 is moved over winding 198 all the way towards branch 190, and switch 192 is then closed. Thereupon, the full voltage of high voltage starter source 191 is impressed between electrodes 180 and 182 so as to impress on the latter electrode a potential which is negative relative to electrode 180. Such potential produces a current flow through the path comprised of high resistance neck 185, strip 184 and low resistance neck 187, and the same potential produces a current flow through the path comprised of strip 183 and high resistance neck 186. At the upstream end of the tube, the current flow through high resistance neck 185 renders the portion of strip 184 near that neck of substantial negative potential relative to the adjacent axially spaced portion of strip 183. At the downstream end of the tube, the high resistance of neck 186 renders the portion of strip 183 near that neck of substantial positive potential relative to electrode 182, whereas the low resistance of neck 187 renders the portion of strip 184 near that neck of a potential which is close to that of electrode 182. In other words, at the downstream end of the tube, the end portion of strip 184 is also maintained at a negative potential relative to the adjacent axially spaced portion of strip 183. Therefore by (and selection of appropriate values of resistance per unit length for elements 183–187), over the adjacent lengths of strips 183 and 184, every point on strip 184 has substantially the same negative potential relative to the corresponding axially spaced point on strip 183. At the same time, over the said length of corona strip 184 there is a progressive increase with distance downstream of negative potential relative to electrode 180, and, likewise, over the said length of attractor strip 183 there is a progressive increase with distance downstream of the negative potential on the strip relative to electrode 180.

Because of the difference in potential between adjacent axially spaced portions of the attractor and corona strips 183 and 184, an ionizing field suitable for negative ion production will be developed over the whole adjacent lengths of these strips.

Moreover, because each of those strips has thereon a potential which is negative relative to electrode 180 and which increases in the downstream direction from point to point along those strips, the ions driven to the wall 181 of the tube 179 will be drained off and replaced with new ions as they are in FIG. 1 converter. Therefore, the FIG. 15 converter operates without any external biasing circuit for the electrodes to provide the same result as the FIG. 1 converter.

To change the FIG. 15 converter from starting to steady state running condition, switch 195 is closed. Next, tap 197 is moved towards branch 193 until all of the resistance of winding 198 has been cut into branch 190 and cut out of branch 193. Then, switch 192 is open to disconnect the high voltage source 190 from the converter. As previously explained in connection with FIG. 1, the kinetic energy of the fluid flowing in tube 179 is converted into high-voltage electrical energy between terminals 180 and 182, and, of that energy, a major fraction will be applied to load 194 whereas a minor fraction will be fed back to attractor and corona electrode strips 183 and 184 to maintain the ionizing field developed between those two strips.

As described in connection with FIG. 4, the FIG. 15 converter may generate electricity by the positive ion mode as well as by the negative ion mode. Despite the fact that strips 183 and 184 are resistive, the converter may be adapted to the production of A.C. voltage by connecting between electrodes 180 and 182 the tuned circuit and starting means described in connection with FIG. 6. The described spiral distributed-resistance electrodes are not limited in their application to tubular converters. Instead, they may be in the form, say, of flat spirals on the surfaces bordering channel 169 of the plates 171 and 172 of the FIG. 13 converter. The advantages among others of employing spiral distributed-resistance electrodes are that no leads need be passed through the dielectric fluid flow guide means, and that the converter is inexpensive to manufacture.

FIGS. 14 and 16–22 illustrate various systems in which EGD conversion is employed. Those systems will now be considered.

The basic features of an open-cycle high-voltage EGD generator system are shown schematically in FIG. 14. High pressure gas and seed material (if necessary) are heated in a chamber 200 and expanded through a nozzle 201 to a high speed, the fluid then entering an EGD converter section 202 which may be any one of the converters heretofore described. For the converters of FIGS. 1–13, a circuit 203 external to the converter is used to bias the electrode thereof, and such circuit may be either the D.C. circuit of FIG. 4 or the A.C. voltage generator circuit of FIG. 5. If the converter section of 202 is of the type shown by FIG. 15, no external electrode biasing circuit is necessary.

The converter output, whether A.C. or D.C. is applied to a high impedance load 204 as shown. The efficiency of converting heat to electricity is approximately the Carnot cycle efficiency $$\frac{T_1 - T_2}{T_1}$$

which is only limited by the resistance of the chamber and throat to high-temperature gases. The power density can exceed $10^8$ watts/m.$^3$ 8 watts/m. superscript 3 so that the device is very compact. Because there are no moving mechanical parts, heavy structural materials, or magnets, the generator is compact, light-weight and silent and simple to use. It can be used as a continuous source, as an intermittent source or as a very high power short pulse source. In the latter case, a rocket engine or explosive may be used as the source of heat and gas. High-power, short pulses of high voltage A.C. or D.C. electricity are ideal for generating bunches of high speed charge particles in a particle accelerator. If the particles are electrons in an X-ray tube, intense burst of X-rays can be produced. In a similar manner, intensive bursts of gamma rays, neutrons, etc. can be produced for laboratory, commercial or military uses.

A steady open-cycle, high-voltage EGD generator is ideal as a topping unit to increase the overall efficiency of conventional steam power plants. At present, magnetohydrodynamic generators are being built for this purpose, but their output is high D.C. current at low voltage and, hence, such output must be subjected to the action of a voltage step-up transformer before being suitable for long range transmission. In contrast, an EGD topping unit can provide A.C. high voltage directly, and this is ideal for long range transmissions. Moreover, such an EGD topping unit is simpler, more compact and cheaper to build than a magnetohydrodynamic generator.

Figure 20:
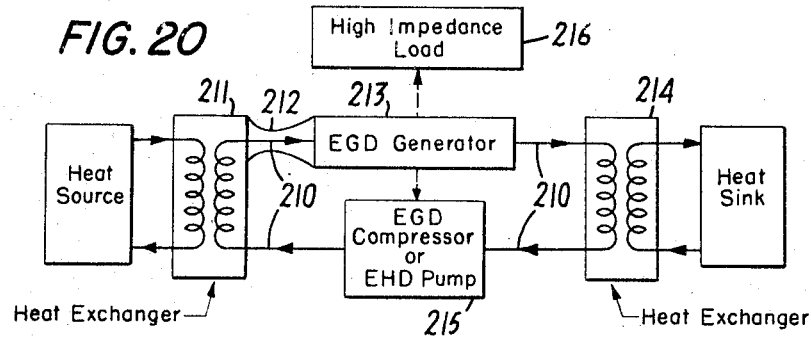
FIG. 20 is a schematic diagram of a closed cycle electrogasdynamic system.

The basic features of a closed-cycle high-voltage EGD generator system are shown schematically in FIGURE 20. Working fluid in a fluid loop 210 is heated in a chamber 211, is next expanded through a nozzle 212 to high speed, and is then passed through an EGD voltage-generator section 213 which can be any one of the EGD voltage generators heretofore described, and which extracts A.C. or D.C. electricity from the fluid stream in the manner heretofore described. After passing through section 213, the working fluid is cooled in heat exchanger 214 and is then compressed and returned to the heating chamber 211 by a unit 215 which for Brayton cycle operation is an EGD compressor and for Rankine cycle operation is an electro-hydrodynamic pump. Of the electric power produced by generator section 213, a major fraction is supplied to a high impedance load 216, and a minor fraction is fed back to the pumping unit 215. Since the unit 215 requires a high voltage, low-current input for its operation, the generator 213 is an ideal power source to drive the unit.

The closed-cycle system of FIGURE 20 can be an all-gas Brayton or a liquid-vapor Rankine cycle. In either case, it is advantageous to operate at as high pressures as possible. This makes the heat exchangers, converter and pump more compact for the same power level. Some good working fluids for a Brayton cycle are: Freon seeded helium, carbon dioxide, Freon 12. Some good working fluids for the Rankine cycle are: Freon seeded water and Freon 113. When a Rankine cycle is used, the unit 215 may be an electro-hydrodynamic pump of the type disclosed by O. M. Stuetzer at page 984 et seq. of volume 30 of the Journal of Applied Physic (1959) and at page 136 et seq. of volume 31 of the Journal of Applied Physic (1960). Overall conversion efficiencies depend on the cycle as well as the temperature difference, but can be as high as 50%. Systems operating at 10 atmospheres and higher are very compact. In some cases, the heat exchangers can be eliminated; e.g., when the heat source is a radio active isotope, and the heat rejection is by radiation. Such a generator system is truly portable and has application as a space power supply or anywhere an unattended supply or high voltage A.C. or D.C. electricity is needed.

Closed-cycle generator systems in the tens to hundreds of megawatt sizes may be built and are ideally suited for central power plants when used in conjunction with a nuclear reactor or a fossil fuel burner. The waste heat can be used to desalinate water or to purify combustion gases. The high voltage may also be used to form hydrogen and oxygen by electrolysis of water.

A closed-cycle EGD generator powered by a nuclear-reactor is an ideal source of high voltage electricity for space propulsion, because high power, at a low specific weight and for a long duration, is obtainable. The power output of such a generator is ideal for ion propulsion rockets, without any additional conversion equipment.

Turning now from voltage generation to fluid propulsion, an EGD converter device of the sort described in connection with FIGURES 1–13 is, with either a high A.C. or high D.C. voltage input, ideal for propelling fluids. If the inlet fluid flow to the propulsor is subsonic, the fluid is compressed and emerges even more subsonic. If the inlet fluid flow to the propulsor is supersonic, the fluid is accelerated and becomes even more supersonic.

The advantages of an EGD compressor over a mechanical compressor are (1) high pressure ratios can be obtained for less weight, (2) high efficiencies can be obtained because the EGD compressor can be made fully isentropic, (3) the EGD compressor offers very low mechanical obstruction to fluid flow, wherefore there is less drag, (4) in an EGD compressor there is little danger of structural damage by foreign objects in the flow, (5) the performance of an EGD compressor is controlled by electrical linkages rather than mechanical ones.

An EGD accelerator performs a task that rotating machinery is incapable of doing, i.e, it is adapted to increase the Mach number of a supersonic flow. The only mechanical technique for accelerating gases is the De Laval nozzle, and such a nozzle is impractical for acceleration to hypersonic speed because the expansion ratio is too large. Therefore, an EGD accelerator for air or other fluids satisfies a need that cannot be satisfied in any other way.

Figure 18:
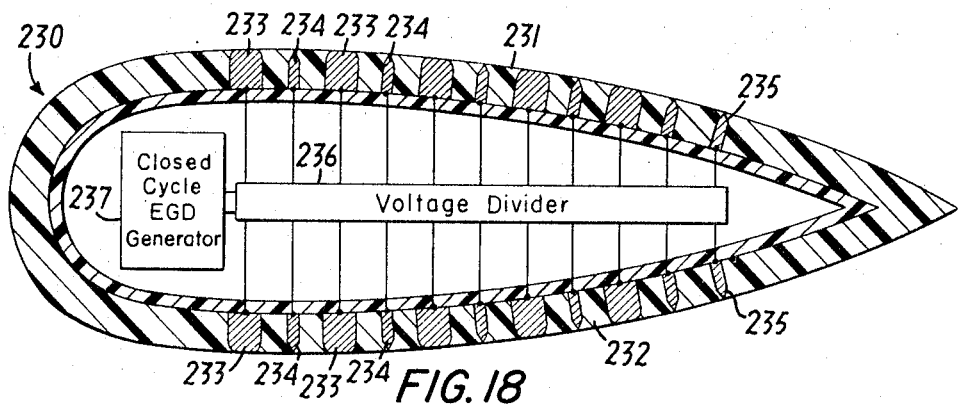
FIG. 18 is a view in cross section of an air foil incorporating electrogasdynamic propulsor means.

FIGURE 18 illustrates an EGD propulsor which is unusual in that the dielectric guide means for the fluid flow is provided by the wing or other air foil of an airplane or other air vehicles such that the flow path for the fluid is defined by the guide means but is not enclosed in a channel. The structure of FIGURE 18 can be considered an analogous to the structure of FIGURE 1 when the latter is turned inside out.

In the FIGURE 18 structure, an airfoil 230 has exterior dielectric layers 231 and 232 on opposite sides of the foil. In each of those layers are paired attractor electrodes 233 and corona electrodes 234 spaced along the line of flow direction of the stream of air passing by the foil. Each of those layers also has at its downstream end a collector electrode 235. The sets of electrodes in layers 231 and 232 are biased by a voltage divider network 236 which, for D.C. operation, may be like the earlier described FIGURE 5 circuit and, for A.C. operation, may be like the earlier described FIGURE 6 circuit when connected to provide fluid propulsion rather than electric power generation. The network 236 is energized by a closed cycle EGD generator of the type shown schematically in FIGURE 20, the generator operating in either the A.C. mode or the D.C. mode. Alternatively, the EGD generator may be an A.C. or D.C. open-cycle generator of the type shown schematically in FIGURE 14. While generator 237 is shown in FIGURE 18 as being disposed within the foil 230, in practice the generator is usually located within the main body of the air vehicle. An EGD generator is particularly suitable in an air vehicle as an electric power source for energizing the air foil EGD propulsor because an EGD generator is the only high voltage low current power source of light enough weight to provide a good power/weight ratio in an air vehicle.

In operation, the stream of air moving over air foil 230 is subjected to a propulsion force (as described in connection with FIGURE 1) so as to produce a forward thrust on the foil and, through the foil, on the air vehicle. The sets of electrodes on the opposite sides of the foil are also useful for exerting boundary layer control on the moving air stream.

FIGURES 16 and 17 illustrate an EGD propulsor in the form of a rotary wind tunnel. The wind tunnel structure is comprised of a dielectric casing 240 around a dielectric fluid guide means in the form of a ring 241 having the shape of a short length of a hollow circular cylinder. A circular cover plate 242 and an annular cover plate 243 are secured by bolts 244 to axially opposite sides of the assembly 240, 241. The port at the center of cover plate 243 is normally closed by a dielectric plug or hatch 245 secured to plate 243 by bolts 246. The plug 245 is removable from plate 243 to provide access to the interior of the tunnel.

Ring 241 provides two sets of EGD propulsor units 250 and 251 on radially opposite sides of the ring. As shown, each of those units is comprised of paired attractor electrodes 252 and corona electrodes 253 and of a collector electrode 254, all of said electrodes being received in the dielectric material of ring 241. The electrodes in each of the two propulsion units are relatively disposed to propel fluid at or near the inner wall 255 of the ring in the counter-clockwise direction around the interior of the ring. To this end, the sets of electrodes in each propulsion unit are connected to an external D.C. propulsive energizing circuit (like that described in connection with FIGURE 5) or to an external A.C. propulsive energizing circuit (like that described in connection with FIGURE 6). Cooling of the fluid being propelled is effected by passing a cooling medium through the shown axial passages 256 in the attractor electrodes 252.

In lieu of being in the form of a ring, the rotary wind tunnel may be toroidal and have propulsor units provided by annular electrodes encircling the toroidal channel.

Figure 21:
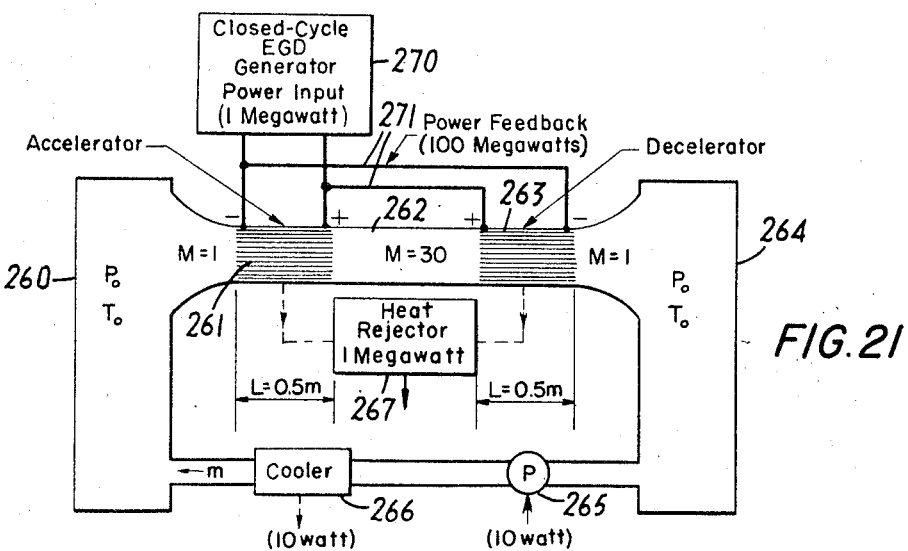
FIG. 21 is a schematic diagram of an electrogasdynamic hypersonic wind tunnel.

FIGURE 21 is a schematic diagram of an EGD hypersonic wind tunnel. In the tunnel, the flow path for the fluid leads from a stagnation chamber 260 through an EGD accelerator 261, a conduit 262 providing a test section, and an EGD generator-decelerator 263 to a stagnation chamber 264. The fluid is returned from chamber 264 to chamber 260 through a fluid path including an EGD pump 265 and a cooler 266 for the exhaust fluid from the pump.

The accelerator 261 and decelerator 263 are multichannel exteriorly cooled structures similar to the structure represented by FIGURE 8 as modified by FIGURE 9. The heat picked up from units 261 and 263 by the cooling medium therein is removed from that medium by a heat exchanger 267.

The accelerator 261 has its electrodes connected to a D.C. propulsive energizing circuit like that of FIG. 5 or to an A.C. propulsive energizing circuit like that of FIG. 6 when connected for propulsion. The decelerator 263 has its electrodes connected to a D.C. voltage generator energizing circuit like that of FIG. 4 or to an A.C. voltage generator energizing circuit like that of FIG. 6 when connected for voltage generation. The net power needed to operate the hypersonic wind tunnel is supplied from a closed cycle EGD generator 270 the same as or like that illustrated schematically by FIG. 20. The decelerator 263 of the FIG. 21 tunnel is a dual function device in that it both decelerates fluid from test section 262 and generates electric power produced by the same action as that which decelerates the fluid. The power available from decelerator 263 is fed back by connection means 271 to supplement the power supplied to the system from closed cycle EGD generator 270.

The operation of the FIG. 21 system is as follows. With units 261 and 263 being turned off, the EGD pump 265 is actuated to bring the flow of fluid around the tunnel to sonic conditions, i.e., Mach 1 flow. Then, high voltage power is fed to the accelerator 261 until the Mach number reaches the desired value in the test section 262, say, $M=30$. Simultaneously, the unit 263 extracts power as it decelerates the flow from $M=30$ to $M=1$. Such power from unit 263 is fed back to unit 261, thereby reducing the net power required from the closed cycle generator 270. At steady state, the net power provided by generator 270 is only that required to overcome frictional and ion slip losses in the system and losses due to cooling the tunnel walls to a temperature compatible with the materials involved. Under appropriate conditions, the net power input to the tunnel system is as little as 1% of the flow power in the test section 262.

The advantages of the FIG. 21 tunnel system are: (1) full re-entry condition, at 200,000 feet or higher, and $M=30$ or more, can be simulated, a performance that no mechanical system can even approximate, (2) the air in the test section is clean, because the additives and erosion of electrodes are negligible, (3) the air is in chemical equilibrium, except for the formation of a little ozone, because the corona discharges do not dissociate the air molecule, (4) the net power required is a small fraction of the full power in the test section, because of the power feedback, (5) the power extracted by cooling is also a small fraction of the power in the test section, whereby the size of the cooling system may be much smaller than that used for conventional hypersonic wind tunnels, (6) the size and cost of the entire facility is much less than for conventional hypersonic wind tunnels, (7) the tunnel system can be scaled down to table top size and still give good performance.

Figure 22:
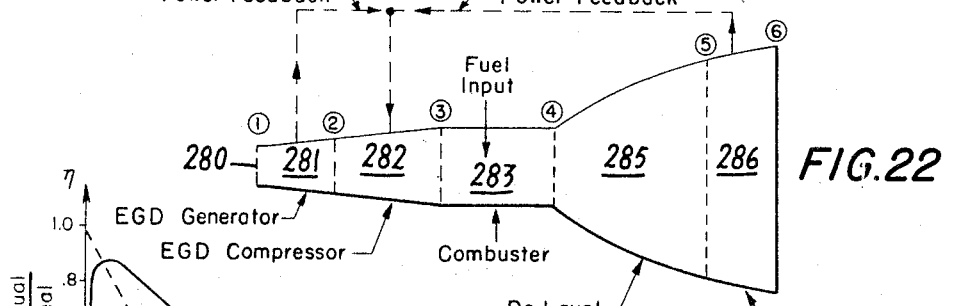
FIG. 22 is a schematic diagram of electrogasdynamic jet propulsion means.

FIG. 22 illustrates a jet propulsion system utilizing EGD components. In such a system, a supersonic flow of air enters input duct 280 and is brought to sonic condition by applying a retarding EGD body force in an EGD generator 281. The electric power output from unit 281 is fed to a subsonic EGD compressor 282 which follows unit 281 in a fluid flow path, and which further compresses the air and feeds it into a heating chamber 283. As indicated by FIG. 22, chamber 283 may be a conventional combustion chamber in which the air is heated by combustion of fuel. Alternatively, chamber 283 may be one in which the air therein is heated by the heat from a nuclear reactor.

The heated air from chamber 283 then is passed through a De Laval nozzle downstream of the chamber. Within the nozzle section, the fluid expands to thereby develop a forward thrust on the FIG. 22 system. At the exit of the nozzle section, another EGD generator section extracts any additional power required to drive the EGD compressor 282. When the flow of fluid which enters duct 280 is subsonic, the EGD generator 281 is not necessary and is removed from the system by opening the connections to its electrodes.

The advantages of the FIGURE 22 system over mechanical air-breathing engines are: (1) there are no rotating mechanical parts to obstruct air flow, so there is reduced internal drag, (2) the engine is smaller, lighter and more reliable without moving parts, and its thrust to weight ratio can exceed 20, so it is capable of propelling VTOL craft to high altitude, and it can be made small enough to be strapped on a man's back, (3) the FIGURE 22 system can operate over a much wider range of altitude and speed than a mechanical air-breathing engine because the inlet can be controlled electrically.

FIGURE 19 shows an EGD device which is incidentally a voltage generator but is primarily a precipitator from a moving fluid (such as the exhaust from an automobile) of undesirable large molecule or multi-molecular particles entrained in the fluid. The device of FIGURE 19 differs from those previously described in that the FIGURE 19 device has attractor and corona electrodes on opposite sides of the fluid flow path.

In FIGURE 19, a circular plate 290 is secured by bolts 291 to a tubular casing 292. The center of plate 290 is in the form of a spider having a central hub 293 joined to the rim of the plate by three equiangularly spaced struts 294. Threadedly received in a central aperture in hub 293 is the front end of a hollow arbor 295 of which the rear end is supported by a spider 296 threadedly received in casing 292 and having a central hub 297 joined to a rim 299 of the spider by three equiangularly spaced struts 298.

The arbor 295 is of dielectric material and acts as a support for two annular, axially-spaced corona electrodes 305a and 305b received in that material. The hollow interior of the arbor provides a passage for making electrical connections to the corona electrodes.

Disposed in casing 292 is a dielectric "throwaway" tube 310 removable from the casing by unscrewing spider 296. The tube 310 has two attractor electrodes 311a and 311b paired with the corona electrode 305a and 305b, respectively, so that each attractor electrode is upstream of its associated corona electrode. While, for convenience of illustration, only two pairs of attractor and corona electrodes have been shown, more pairs can be used.

Each of the attractor electrodes is in the form of an annular ring and is comprised of a fibrous metal mass 312 (e.g., steel wool) spaced from arbor 295 and secured to tube 310 by metal bands 313 spaced around the inner wall of the tube and passing through radial holes in the tube to form a loop around the mass 312 and a portion of the tube. The outer sides of the band 313 are received in small axial slots formed in the exterior of tube 310 for the purpose of preventing such outer sides from projecting radially outward. Electrical connections to the attractor electrodes are made by leaf springs 314 contained in an axial slot 315 formed in casing 292, the leaf springs being shaped so that each makes pressure contact with one of the metal bands 313 of the attractor electrode corresponding to that leaf spring.

The tube 310 also has an annular corona electrode 320 disposed at the downstream end of the tube and incorporated into the dielectric material thereof. The electrical connection to collector electrode 320 is made through a leaf spring contact 321 contained in slot 315. If desired, the collector electrode 320 may be incorporated in arbor 295.

From a study of the electrical connections shown in FIGURE 19, it is evident that those connections provide for the electrodes of the FIGURE 19 precipitator a D.C. voltage-generator energizing circuit which is the electrical equivalent of the circuit of FIGURE 4 except that in the FIGURE 19 circuit the entire output power is fed back to the attractor and corona electrodes to maintain the ionizing fields therebetween.

The FIGURE 19 precipitator operates as follows. A moving fluid stream with undesired entrained particles enters the precipitator through the openings between struts 294, passes through the annular channel 325 between arbor 295 and tube 310, and then exhausts through the openings between struts 298. In moving through channel 325, the fluid generates voltage between electrodes 311a and 320 in the manner already described once generation of voltage is initiated by a starting potential. The generated voltage produces a cross-channel ionizing field between each corona electrode and its associated attractor electrode so as to ionize the undesired particles in the fluid. Once those particles are ionized, they are driven to the walls of tube 310 both by the mutual electrostatic repulsion of their respective charges and by the cross-channel ionizing fields which are directed to repel the ionized particles radially outward. Because the ionizing fields and the force of mutual electrostatic charge repulsion both drive the particles away from the corona electrodes, very few of the particles deposit on electrodes 305a, 305b which, accordingly, remain unfouled for a long period. The ionized particles do, however, deposit on the fibrous masses 312 of the attractor electrodes and (to some extent) on the inner wall of tube 310. When the deposit on the attractor electrodes has built up to the point where the efficiency of performance of the precipitator begins to fall off, the fouled tube 310 is removed from the precipitator and replaced by a fresh tube 310.

One working example for an EGD converter has already been given. Another working example of a small size EGD voltage generator is as follows. The converter structure is that of the FIG. 1 converter with a tapered channel which diverges downstream (FIG. 3). The channel has a length of 4.0", an inner diameter at the upstream end of 0.092" and an inner diameter at the downstream end of 0.165". The dielectric wall of the channel is 0.25" thick and has therein a plurality of attractor electrodes each having a greatest dimension in the channel length of 0.08", the attractor electrodes being spaced apart along the channel by about 0.08". The corona electrodes have a greatest thickness in the length of the channel of about 0.005", each corona electrode being spaced from its paired attractor electrode by about 0.03". The dielectric material of the channel wall is polycarbonate plastic, whereas the electrodes are made of copper. The working fluid is water vapor from a boiler.

When the described example is in operation, inlet conditions are as follows:

| | | |
|---|---|---|
| Mass flow rate | lb. mass/sec. | $4.26 \times 10^3$ |
| Speed | ft./sec. | 3,330 |
| Pressure | p.s.i. | 90 |
| Temperature | °F. | 188 |
| Quality of the mixture | | 858 |
| Mach No. | | 2.10 | and exit condition are as follows:

| | |
|---|---|
| Mass flow rate | Same |
| Pressure | [1] Same |
| Temperature | [1] Same |
| Density | [1] Same |
| Speed | 1050 |
| Mach No. | 1.21 |

[1] Channel expansion $$A \propto \frac{1}{u}$$

(where $u$ is instantaneous speed of the fluid) keeps state of gas unchanged during extraction.

and the output is:

| | | |
|---|---|---|
| Power | watts | $10^3$ |
| Voltage | volts | $10^5$ |
| Current | amps | $10^{-2}$ |

The power required to operate the ionizing fields and to cool the walls is less than 10% of the output power.

The above-described embodiments of the invention being exemplary only, it is to be understood that additions thereto, modifications thereof and omissions therefrom can be made without departing from the spirit of the invention, and that the inveniton comprehends embodiments differing in form and/or detail from those which have been specifically described.

For example, the channels of the FIG. 11 converter may be "straight" (of constant cross-sectional area) instead of being tapered. Conversely, the channels of the converters of FIGS. 8 and 9 may converge or diverge in the downstream direction in their lateral dimension or in their transverse dimension or in both those dimensions. In connection with FIGS. 8 and 10, if a diverging or converging channel is desired, it is often advantageous to have the divergence or convergence only in the lateral dimension $w$ since then the smaller transverse dimension $t$ (of which $E_r$ is a function) can have over the length of the channel a constant value which is the maximum value at which a safe $E_r$ is not exceeded under the given operating conditions. The channels of the FIG. 10 converter may, of course each diverge or converge in the downstream direction and, in the FIG. 13 converter, plates 171 and 172 may diverge or converge radially outward in the radial plane.

Accordingly, the invention is not to be considered as limited save as is consonant with the recitals of the following claims.

I claim:

1. Electrogasdynamic apparatus for ionizing and operating on a stream of fluid to effect an energy conversion comprising, dielectric fluid guide means providing a boundary wall configuration at opposed sides of a flow path for said stream, said configuration being definitive of a line of flow for said fluid between upstream and downstream portions of said guide means spaced from each other in the direction of said line of flow, corona discharge electrode means disposed at said boundary wall configuration to be at the side of said path, said electrode means having at least a portion thereof exposed to a boundary region of said path, attractor electrode means spaced from said corona means in said direction by a dielectric portion of the guide means and disposed at said boundary wall configuration to be at the same side of said path to form with said corona means an ionizing electrode pair, said attractor means also having at least a portion thereof exposed to said boundary region, electrical circuit means for establishing between said electrode pair an ionizing field to produce ions in said path, and collector electrode means spaced downstream from said corona and attractor means and disposed in relation to said configuration to collect ions from said path and establish an electrical potential creating a non-ionizing body force field on the stream in said direction downstream of said electrode pair.

2. Apparatus as in claim 1 further comprising means to bring cooling fluid into contact with at least said attractor electrode means to thereby remove heat through such electrode means from fluid in said path.

3. Apparatus as in claim 1 in which said boundary wall configuration forms part of a closed circumferential wall of an enclosure for said fluid.

4. Apparatus as in claim 1 in which said attractor electrode means is upstream in said line direction of said corona means to establish an electric discharge in a direction opposite to the direction of flow.

5. Apparatus as in claim 1 in which the two attractor and corona electrode means are recessed in relation to the guide means to be inward of the boundary wall configuration surface except for the exposed positions thereof, the dimension of the attractor electrode means exposed portion being greater than the dimension of the corona electrode means exposed portion in said direction, the exposed portion of said attractor electrode means having adjacent thereto on its downstream side a rounded edge portion of such electrode means, and in which such rounded edge portion is covered by dielectric material of said guide means so as to provide a smooth transition in said direction between the surfaces towards said path of, respectively, said exposed electrode portion and said dielectric material to reduce electric field stresses.

6. Apparatus as in claim 1 in which the exposed portion of said corona electrode means comprises a sharp electrode edge disposed transverse to said direction and having an elongated transverse extent, said edge throughout said transverse extent being at the side of said path.

7. Apparatus as in claim 6 in which said sharp edge is transversely continuous.

8. Apparatus as in claim 6 in which said sharp edge is transversely discontinuous to form a succession of corona points in said transverse extent.

9. Apparatus as in claim 1 in which said guide means has laterally opposite substantially planar walls providing said configuration, and in which each of said corona and attractor electrode means comprises at least two laterally opposite electrodes of which each is on a respective one of said two walls.

10. Apparatus as defined in claim 1 in which said collector electrode means is spaced in the direction of flow from the downstream one of the attractor and corona electrodes by a distance exceeding the spacing between said last-named electrodes.

11. Apparatus according to claim 1, in which the electrical circuit means is effective to establish a potential between said corona and attractor electrode means which is less than the potential between said collector electrode means and either of said other two electrodes.

12. Apparatus as defined in claim 1, in which the electrical circuit means and the corona and attractor electrode means are effective to maintain the strength of said ionizing field in excess of the strength of said body force field in the direction of flow.

13. Apparatus as set forth in claim 1 in which the collector electrode means is located at the side of the channel and is separated from said corona and attractor electrode means by a dielectric portion of said guide means.

14. Apparatus for ionizing a stream of fluid comprising, dielectric fluid guide means providing a boundary wall configuration for a path for said stream, said configuration being definitive of a line of flow for such fluid between upstream and downstream portions of said guide means spaced from each other in the direction of said line of flow, corona discharge electrode means disposed at said boundary wall configuration to be at the side of said path, said electrode means having a plurality of helical turns exposed to a boundary region of said path and by which such electrode means is distributed in said direction over an extent of said configuration, attractor electrode means spaced from said corona means and disposed at said boundary wall configuration to be at the side of said path, said attractor means having a plurality of helical turns exposed to said region and by which said attractor means is distributed in said direction over an extent of said configuration substantially corresponding to said extent of said corona means, and means to apply a voltage across the helical length of each of said two electrode means so as to produce a potential difference between corresponding exposed points on one end and the other of such two electrode means.

15. Electrogasdynamic apparatus for ionizing and operating on a stream of fluid to effect a conversion of the kinetic energy of said fluid into electric power, said apparatus comprising, fluid guide means providing a boundary wall configuration at opposed sides of a flow path for said stream, corona discharge electrode means electrically coupled in respect to an electric field with a region of said path, attractor electrode means spaced in the direction of the line of flow from said corona means by a dielectric portion of said guide means and electrically coupled in respect to said field with said region, collector electrode means downstream from said corona and attractor means and disposed in relation to said configuration to collect ions from said path and establish an electrical potential productive of a non-ionizing body force field region downstream of the corona and attractor electrodes, and electrical energy feedback means in circuit with each of said three electrode means and responsive to electric power generated at said collector electrode means by said kinetic energy to feed back to said corona and attractor electrode means at least a fraction of such power so as to develop in said region and between the last-named two electrode means an electric ionizing field of appropriate polarity to sustain said generation of power at said collector electrode means.

16. Electrogasdynamic apparatus for ionizing and operating on a stream of fluid to effect an energy conversion comprising, dielectric fluid guide means having an inlet and an outlet and providing therebetween a channel for said stream, corona discharge electrode means disposed downstream of said inlet at the side of said channel and having at least a portion of such electrode means exposed to the channel interior, attractor electrode means disposed upstream from said corona means by a dielectric portion of the guide means, at least a portion of said attractor means being exposed to said channel interior, collector electrode means spaced downstream from said corona means and attractor means and disposed in relation to said channel to collect ions therefrom, and electrical circuit means coupled in respect of each of said electrode means to establish in the direction of the line of flow an ionizing field to produce the ions and to maintain in said direction a non-ionizing body force field in the flow between the ionizing field and the collector electrode means.

17. Apparatus as in claim 16 in which each of said three electrode means is disposed on each of laterally opposite sides of said channel.

18. Apparatus as in claim 16 in which the ratio of the length of said channel between the mutually remote extremities of said attractor and collector electrode means to the smallest cross-sectional dimension of said channel is a ratio having a value within the range between and including 5 and 50.

19. Apparatus as in claim 16 in which said channel has a greater transverse cross-sectional dimension than lateral cross-sectional dimension.

20. Apparatus as in claim 19 in which said channel is of polygonal cross section.

21. Apparatus as in claim 16 in which said channel is of progressively increasing cross section from said inlet to said outlet.

22. Apparatus as in claim 16 in which said guide means comprises a pair of coaxial, laterally spaced annular plates, said channel being between said plates, and the flow direction for fluid in said channel being radial.

23. Apparatus as in claim 16 in which said guide means comprises a pair of nested tubes having an annular space therebetween, and in which said channel is provided by said annular space and extends between the axially opposite ends of said tubes.

24. Apparatus as in claim 16 in which said guide means provides for said stream between said inlet and outlet at least one channel which is in addition to said previously described channel, and which is characterized like said previously described channel by corona discharge electrode means, attractor electrode means and collector electrode means, and in which said two channels are separated by a common partition wall.

25. Apparatus as in claim 24 in which in each of said two channels the ratio of the length therein between the mutually remote extremities of the attractor means and the collector electrode means to the smallest cross-sectional dimension of the channel is characterized by a value in the range between and including 10 and 1000.

26. Apparatus as in claim 24 in which said partition wall is circular in cross section, and in which at least the radially outward one of said channels is annular in cross section.

27. Apparatus as in claim 24 in which said partition wall is substantially planar in cross section and extends transversely from side to side of said guide means, and in which said channels are of polygonal cross-section and are on laterally opposite sides of said wall.

28. Electrogasdynamic apparatus for ionizing and operating on a stream of fluid to effect an energy conversion, said apparatus comprising, fluid guide means providing a boundary wall configuration for at least two flow paths for said stream, said configuration being definitive for each such path of a line of flow for said fluid between upstream and downstream portions of said guide means spaced from each other in the direction of said line of flow, and said two paths being separated by a common partition wall, corona electrode means extending through said partition wall to have a portion thereof exposed at the side of each of said paths to a boundary region of such path, attractor electrode means spaced from said corona means in said direction, by a dielectric portion of said guide means and extending through said partition wall to have a portion thereof exposed at the side of each of said paths to said region of such path to establish between said electrodes in each path an ionizing field for producing ions therein, and collector electrode means disposed downstream from said corona and attractor means and extending through said partition wall to be exposed to ions in each of said paths to develop an electric potential producing in each path a sustained non-ionizing body force field in the direction of the line of flow downstream of the ionizing field.

29. Electrogasdynamic apparatus for ionizing and operating on a stream of fluid to effect an energy conversion, said apparatus comprising, dielectric fluid guide means providing a boundary wall configuration for a flow path for said stream, said configuration being definitive of a flow line for such fluid between upstream and downstream portions of said guide means spaced from each other in the direction of said flow line, a plurality of corona discharge electrodes disposed in spaced relation in said direction, a corresponding plurality of attractor electrodes disposed in spaced relation in said direction, each of said attractor electrodes being adjacent to and paired with a respective one of said corona electrodes, each of said corona and attractor electrodes being separated by a dielectric portion of said guide means, and a collector electrode disposed downstream from said corona and attractor electrodes, each of said corona, attractor and collector electrodes being coupled in respect to an electric field with a region of said path adjacent said boundary wall configuration to establish a plurality of spaced ionizing field regions and a body force field between said collector electrode means and at least one of said electrode pairs.

30. Apparatus as in claim 29 in which each attractor electrode is upstream of the corresponding corona electrode, each attractor electrode except the one farthest upstream being between two of said corona electrodes, thereby to establish an electric discharge flow in a direction opposite to the direction of flow of the stream.

31. Apparatus as in claim 29 further comprising, voltage divider means connected between said collector electrode and a current return point to maintain said ionizing and body force fields, said divider means having therein electrically spaced voltage points of which each corresponds in successive order in the direction towards such electrode to a respective one of said corona electrodes taken in successive order in said flow direction, means connecting each corona electrode to the corresponding one of said points, and means connecting each of said attractor electrodes to a voltage point on said divider means productive of an ionizing potential between such attractor electrode and the paired corona electrode.

32. Apparatus as in claim 31 in which said voltage divider means is resistive means responsive to a D.C. potential between said collector electrode and said return point to impart respective D.C. potentials to said attractor and corona electrodes.

33. Apparatus as defined in claim 29, in which the spacing between adjacent electrode pairs exceeds the spacing between the corona and attractor electrodes in each pair.

34. Electrogasdynamic apparatus for ionizing and operating on a stream of fluid to effect an energy conversion, said apparatus comprising, fluid dielectric guide means providing a boundary wall configuration for a flow path for said stream, said configuration being definitive of a line of flow for said fluid between upstream and downstream portions of said guide means spaced from each other in the direction of said line of flow, a plurality of corona electrodes spaced from each other in said direction and each disposed at said boundary configuration to be at the side of said path, a plurality of attractor electrodes of which each corresponds to and is paired with a respective one of said corona electrodes, said attractor electrodes being spaced from each other in said direction and being disposed at said boundary configuration so that each such attractor electrode is at the same side of said path as the corresponding corona electrode, each attractor electrode being upstream of the corresponding corona electrode to produce an ionizing field discharge therebetween in a direction opposite to the direction of the flow of the stream, and each attractor electrode except the one farthest upstream being between two corona electrodes, each of said corona and attractor electrodes being mutually separated by a dielectric portion of said guide means and having a portion substantially flush with the surface of said boundary wall configuration and exposed to a boundary region of said path, and a collector electrode downstream from said corona and attractor electrodes and disposed in relation to said configuration to collect ions from said path and to establish a body force field in said direction between at least one of said corona and attractor electrode pairs and the collector electrode.

35. Electrogasdynamic apparatus for precipitating undesired ionizable particles entrained in a stream of fluid, said apparatus comprising, dielectric fluid guide means providing a boundary wall configuration for a channel for said stream, said channel having an inlet and outlet, corona discharge electrode means disposed at said configuration next to the dielectric of said guide means to be at the side of said channel, attractor electrode means disposed at said configuration next to the dielectric of said guide means to be at the side of said channel and across said channel from said corona means, said corona and attractor electrodes being separated by a dielectric portion of said guide means, collector electrode means downstream from said corona and attractor means and disposed in relation to said channel to collect ions therefrom so as to develop electrical energy, and voltage divider means connected in circuit with said three electrode means to feed back said energy to said corona and attractor so as to develop therebetween a potential field for ionizing said particles in said stream and effecting precipitation of such particles at the side of said channel and for maintaining a non-ionizing body force field in said channel downstream of the ionizing potential field.

36. Apparatus as in claim 35 in which said channel is in the form of an annular wall, and in which said corona and attractor electrode means are disposed at, respectively, the inner wall and the outer wall of said channel.

37. The method of effecting an electrogasdynamic energy conversion comprising, passing a turbulent stream of fluid through a flow path, applying from the side of said path to fluid in a boundary region of said path an ionizing electric field by which ions are produced in said fluid, and exposing said ions to a simultaneously existing, non-ionizing collecting electric field immediately downstream of said ionizing electric field.

38. The method of effecting an electrogasdynamic energy conversion comprising, entraining in a working fluid a plurality of electropositive ionizable particles and a plurality of electronegative ionizable particles, thereafter passing said fluid through a flow path, applying to fluid in said path from a first region in the extent of the line of flow of said path an alternating electric field by which said electropositive and electronegative particles are alternately ionized, and simultaneously applying to fluid in said path from a second region downstream from said first region a non-ionizing ion-collecting alternating field synchronous in frequency with said first-named field and operative to exert a force on said fluid.

39. A method as in claim 38 in which the period of said alternating fields is greater than the transit time of said ionized particles from said first region to said second region.

40. Electrogasdynamic energy - converter apparatus comprising, fluid flow guide means definitive of a flow path for a stream of working fluid, and attractor, corona and collector electrode means interactive with fluid in said path to ionize said fluid and subject it to an electrostatic body force, all said electrode means being at the side of said path and being electrically exposed thereto and all of said electrodes being mutually separated by dielectric portions of the guide means.

41. Electrogasdynamic energy - converter apparatus comprising, fluid flow guide means definitive of a flow path for a stream of working fluid, electrode means electrically exposed to said path and interactive with fluid in said path to ionize said fluid and subject it to an electrostatic body force, and fluid cooling means external to said path and in heat-transfer relation therewith to remove heat from said fluid as said heat develops in said path.

42. Electrogasdynamic energy - converter apparatus comprising, fluid flow guide means definitive of a fluid flow path for a stream of gaseous working fluid ionizing and collector electrode means spaced in the direction of flow and electrically exposed to said path and responsive to energization to subject fluid in said path to at least one ionizing field and to a non-ionizing electrostatic body force field, and A.C. circuit means connected to said electrode means to render said ionizing and body force fields of alternating current character, said ionizing and body force fields existing simultaneously in the flow path over adjacent distances of the guide means.

43. Electrogasdynamic voltage generating apparatus comprising, fluid flow guide means definitive of a fluid flow path for a stream of gaseous working fluid, electrode means electrically exposed to said path and responsive to energization to subject fluid in said path to at least one ionizing field and to a non-ionizing ion-repelling electrostatic body force field existing in a region adjacent to and downstream of said ionizing field, A.C. circuit means connected to said electrode means to render said fields simultaneous and of alternating current character, and output terminal means providing an output potential for transfer of A.C. electrical energy from said electrode means to a load.

44. Electrogasdynamic energy - converter apparatus comprising fluid flow guide means definitive of a closed channel for a stream of working fluid, the ratio of the length of said channel in the line of flow direction of said fluid to the smallest cross sectional channel dimension normal to said line of flow direction being a ratio having a value of at least 10, and attractor, corona, and collector electrode means all disposed at the side of said channel to be electrically exposed to said channel and interactive with fluid in said channel to subject said fluid to at least one ionizing field and to an electrostatic body force.

45. The electrogasdynamic conversion method comprising, flowing a working fluid through a flow path bounded by guide means for said path, ionizing said fluid, and subjecting said fluid to an applied electrostatic field which produces slip between the ions in the fluid and the neutral molecules thereof, said field having a value in volts/meter at which the heating rate of the fluid due to ion slip approximates the heating rate of the fluid due to friction between said fluid and said guide means, said ion slip heating rate being at most twice that of said friction heating rate and at least half that of said friction heating rate.

46. The electrogasdynamic conversion method comprising, passing through a closed channel bounded by dielectric guide means for said path a stream of working fluid, the flow of said fluid in said channel being characterized by a Reynolds number of at least 2,000, ionizing said fluid in said channel to produce in said path an ion density of at least $10^{17}$ ions per cubic meter, at one atmospheric pressure, said minimum ion density value being proportionally greater or lesser at, respectively, a proportionally greater and lesser pressure value, said channel having a cross section of a size and configuration which renders the radial component of the space-charge field produced by ions in said fluid at said ion density of a value less than the breakdown strength of the dielectric material of said guide means.

47. The electrogasdynamic method comprising, passing turbulently through a flow path a stream of working fluid, and ionizing said fluid by an electric field produced between corona electrode means and by attractor electrode means spaced in the upstream direction from said corona electrode means to produce an electrical discharge in a direction opposite to the direction of flow of the stream.

48. Electrogasdynamic energy - converter apparatus comprising, fluid flow guide means definitive of a flow path for a stream of working fluid, and separate attractor and corona electrode means each electrically exposed to said path and responsive to energization to develop therebetween at least one electric field by which fluid in said path is ionized, said attractor electrode means being spaced from and upstream of said corona electrode means to create an electrical discharge in a direction opposite to the direction of flow of the stream.

49. Electrogasdynamic apparatus for ionizing and operating on a stream of fluid to effect a conversion of the kinetic energy of said fluid into electric power, said apparatus comprising, fluid guide means providing a boundary wall configuration for a flow path for said stream, corona discharge electrode means coupled in respect to an electric field with a region of said path, attractor electrode means spaced from said corona means and coupled in respect to said field with said region, collector electrode means downstream from said corona and attractor means and disposed in relation to said configuration to collect ions from said path, electrical energy feedback means in circuit with each of said three electrode means and responsive to electric power generated at said collector electrode means by said kinetic energy to feed back to said corona and attractor electrode means at least a fraction of such power so as to develop in said region and between the last-named two electrode means an electric ionizing field of appropriate polarity to sustain said generation of power at said collector electrode means, and means to apply between said corona and attractor electrode means a temporary starting potential effective to initiate the generation of power at said collector electrode means.

50. Electrogasdynamic apparatus for ionizing and operating on a stream of fluid to effect a conversion of the kinetic energy of said fluid into electric power, said apparatus comprising, fluid guide means providing a boundary wall configuration for a flow path for said stream, corona discharge electrode means coupled in respect to an electric field with a region of said path, attractor electrode means spaced from said corona means and coupled in respect to said field with said region, collector electrode means downstream from said corona and attractor means and disposed in relation to said configuration to collect ions from said path, electrical energy feedback means in circuit with each of said three electrode means and responsive to alternating current electric power generated at said collector electrode means by said kinetic energy to feed back to said corona and attractor electrode means at least a fraction of such alternating current power so as to develop in said region and between the last-named two electrode means an alternating current electric ionizing field of appropriate polarity to sustain said generation of power at said collector electrode means, and means in circuit with said feedback means to control the frequency of said alternating current power and said alternating current ionizing field.

51. Electrogasdynamic apparatus for ionizing and operating on a stream of fluid to effect an energy conversion, said apparatus comprising dielectric fluid guide means providing a boundary wall configuration for a flow path for said stream, said configuration being definitive of a flow line for such fluid between upstream and downstream portions of said guide means spaced from each other in the direction of said flow line, a plurality of corona discharge electrodes disposed in spaced relation in said direction, a corresponding plurality of attractor electrodes disposed in spaced relation in said direction, each of said attractor electrodes being adjacent to and paired with a respective one of said corona electrodes, a collector electrode disposed downstream from said corona and attractor electrodes, each of said corona, attractor and collector electrodes being coupled in respect to an electric field with a region of said path adjacent said boundary wall configuration, reactive voltage divider means connected between and responsive to an A.C. potential between said collector electrodes and a current return point, said divider means having therein electrically spaced voltage points of which each corresponds in successive order in the direction toward such electrode to a respective one of said corona electrodes taken in successive order in said flow direction, means connecting each corona electrode to the corresponding one of said points, means connecting each of said attractor electrodes to a voltage point on said divider means productive of an A.C. ionizing potential between such attractor electrode and the paired corona electrode, and tuned circuit means in circuit with said reactive voltage divider means to control the frequency of said A.C. potentials.

52. Electrogasdynamic generator for ionizing and operating on a stream of fluid to effect an energy conversion; said apparatus comprising dielectric fluid guide means providing a boundary wall configuration for a flow path for said stream, said configuration being definitive of a flow line for such fluid between upstream and downstream portions of said guide means spaced from each other in the direction of said flow line, a plurality of corona discharge electrodes disposed in spaced relation in said direction, a corresponding plurality of attractor electrodes disposed in spaced relation in said direction, each of said attractor electrodes being adjacent to and paired with a respective one of said corona electrodes, and a collector electrode disposed downstream from said corona and attractor electrodes, each of said corona, attractor and collector electrodes being coupled in respect to an electric field with a region of said path adjacent said boundary wall configuration, voltage divider means connected between said collector electrodes and a current return point, said divider means having therein electrically spaced voltage points of which each corresponds in successive order in the direction toward such electrode to a respective one of said corona electrodes taken in successive order in said flow direction, means connecting each corona electrode to the corresponding one of said points, means connecting each of said attractor electrodes to a voltage point on said divider means productive of an ionizing potential between such attractor electrode and the paired corona electrode, and means to apply a temporary starting potential across at least part of said voltage divider means, the normal operating potential on said collector electrode providing through said divider means the normal operating potentials for said attractor and corona electrodes.

53. Apparatus as set forth in claim 41, in which the fluid guide means comprises a flow tube surrounding the flow path and the fluid cooling means includes a conduit surrounding the flow tube to define therewith an annular cooling fluid passage.

54. Apparatus as called for in claim 53, in which said electrode means project through the flow tube into the annular cooling fluid passage to be cooled by cooling fluid flow therethrough.

55. Apparatus in accordance with claim 54, in which said electrode means form with said conduit and said flow tube a labyrinthine passage for the cooling fluid.

56. Electrogasdynamic apparatus for ionizing and operating on a gaseous stream to effect an energy conversion, comprising dielectric fluid guide means surrounding the stream to provide a flow channel therefor, electrical discharge and attractor electrode means disposed at the side of the channel and spaced in the direction of flow by a dielectric portion of the channel, the discharge and attractor electrodes having portions exposed to the stream and being substantially flush with the channel side, means for applying a potential between the discharge and attractor electrodes to establish an electrical discharge field for producing mobile charges in the stream, collector electrode means exposed to the stream and disposed downstream from the discharge field by a distance exceeding the spacing between the attractor and discharge electrodes to collect charges from the stream, the ratio between said distance and the smallest dimension of the channel normal to flow being at least equal to 5, and electrical circuit means coupled to the collector electrode to establish thereat a potential productive of a non-ionizing body force field in the channel downstream of and existing simultaneously with the electrical discharge field.

References Cited

UNITED STATES PATENTS

| | | | |
|---|---|---|---|
| 2,210,918 | 8/1940 | Karlovitz et al. | 310—11 |
| 3,167,666 | 1/1965 | Janner et al. | 310—6 |
| 2,004,352 | 6/1935 | Simon | 310—5 |
| 3,095,163 | 6/1963 | Hill | 244—12 |

FOREIGN PATENTS

| | | |
|---|---|---|
| 1,330,199 | 5/1963 | France. |
| 371,599 | 12/1921 | Germany. |

OTHER REFERENCES

Raskin: Academie des Sciences, Jan. 16, 1939, pp. 170–172.

Steutzer: "Ion Drag Pumps," Journal of Applied Physics, January 1960, pp. 136–146.

Ye. I. Yantovskiy et al.: "Schemes of Electrogasdynamic Machines" Transactions, 1961, RIGA Conf. on Plasma Physics, pp. 437–442.

J. D. MILLER, *Primary Examiner.*

DAVID X. SLINEY, *Assistant Examiner.*

UNITED STATES PATENT OFFICE
CERTIFICATE OF CORRECTION

Patent No. 3,452,225  Dated June 24, 1969

Inventor(s) Meredith C. Gourdine

It is certified that error appears in the above-identified patent and that said Letters Patent are hereby corrected as shown below:

Column 4, line 9, "exially" should read --axially--. Column 5, line 42, "flatas" should read --flats--. Column 13, Equation (2) the term within the brackets reading:

$$\tau_f U + \tau_b U_i \quad \text{should be} \quad \tau_f u + \tau_b U_i$$

line 43, "P" should be --$\rho$--; line 55, "$\overline{k}$" should be --$\overline{k}_i$--; Equation (7), first fraction within the brackets reading:

$$\frac{c_f \overline{kp};\overline{u}}{2\epsilon_o E_r} \quad \text{should read} \quad \frac{c_f \overline{k}_i \overline{\rho u}}{2\epsilon_o E_r}$$

Equation (7), second term within the brackets reading:

$$\frac{\overline{k}_i E_x}{\overline{u}} \quad \text{should read} \quad \frac{\overline{k}_i E_x^{-1}}{\overline{u}}$$

Equation (7), last term within the brackets reading:

$$\frac{k_i E_x}{\overline{u}} \quad \text{should read} \quad \frac{\overline{k}_i E_x}{\overline{u}}$$

line 74, "$k_i E_x/\overline{u}$" should be --$\overline{k}_i E_x/\overline{u}$--. Column 14, line 7, $$\frac{\overline{k}_i E_x^*}{u^*} \quad \text{should be} \quad \frac{\overline{k}_i E_x}{\overline{u}}$$

UNITED STATES PATENT OFFICE
CERTIFICATE OF CORRECTION

Patent No. 3,452,225            Dated June 24, 1969

Inventor(s) Meredith C. Gourdine      PAGE - 2

It is certified that error appears in the above-identified patent and that said Letters Patent are hereby corrected as shown below:

Line 16, change "$\beta^2$" to --$\beta < $--; Equation (12), "$\Delta p'$" should be --$\Delta p$--; line 35, delete "for"; line 37, "$c_f \approx c_f$" should be --$c_f^1 \approx c_f$--. Column 15, line 25, should read $$\bar{\rho} = 1 \text{ kg./m.}^3 \quad \frac{\text{m.}^2}{\text{VoH-sec.}}$$

line 29, "$2_0$" should be --$\varepsilon_0$--; line 30, "$E_v$" should be --$E_r$--; line 57, "4Dx1000" should be --$L/D \approx 1000$--.

Column 19, line 59, delete "8 watts/m. superscript 3". Column 24, line 16, change "corona" to --collector--. Column 25, line 9, "858" should be --.858--.

Signed and sealed this 20th day of July 1970.

(SEAL)
Attest:

EDWARD M. FLETCHER, JR.            WILLIAM E. SCHUYLER, JR.
Attesting Officer                  Commissioner of Patents